US 6,593,046 B2

(12) United States Patent
Sorriero et al.

(10) Patent No.: US 6,593,046 B2
(45) Date of Patent: Jul. 15, 2003

(54) PHOTOCONDUCTIVE ELEMENTS HAVING A POLYMERIC BARRIER LAYER

(75) Inventors: Louis J. Sorriero, Rochester, NY (US); Michel F. Molaire, Rochester, NY (US); Marie B. O'Regan, Santa Barbara, CA (US); Wayne T. Ferrar, Rochester, NY (US); David S. Weiss, Rochester, NY (US); Jane Robin Cowdery, Webster, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/954,907

(22) Filed: Sep. 18, 2001

(65) Prior Publication Data

US 2002/0155365 A1 Oct. 24, 2002

Related U.S. Application Data

(63) Continuation-in-part of application No. 09/574,775, filed on May 19, 2000, now Pat. No. 6,294,301.

(51) Int. Cl.$^7$ .................................................. G03G 5/10
(52) U.S. Cl. ............................................ 430/64; 430/96
(58) Field of Search ...................................... 430/64, 96

(56) References Cited

U.S. PATENT DOCUMENTS

| | | |
|---|---|---|
| 3,428,451 A | 2/1969 | Trevoy et al. |
| 3,658,773 A | 4/1972 | Zecher et al. |
| 3,856,752 A | 12/1974 | Bateman et al. |
| 4,082,551 A | 4/1978 | Steklenski et al. |
| 4,442,193 A | 4/1984 | Chen et al. |
| 4,618,560 A | 10/1986 | Borsenberger et al. |
| 4,668,600 A | 5/1987 | Lingnau |
| 4,687,834 A | 8/1987 | Bartmann et al. |
| 4,830,953 A | 5/1989 | Bateman |
| 4,971,873 A | 11/1990 | Pavlisko et al. |
| 4,992,349 A | 2/1991 | Chen et al. |
| 5,128,226 A | 7/1992 | Hung |
| 5,266,429 A | 11/1993 | Sorriero et al. |
| 5,266,431 A | 11/1993 | Mammino et al. |
| 5,614,342 A | 3/1997 | Molaire et al. |
| 5,641,599 A | 6/1997 | Markovics et al. |
| 5,681,677 A | 10/1997 | Bugner et al. |
| 5,693,442 A | 12/1997 | Weiss et al. |
| 5,733,695 A | 3/1998 | Molaire et al. |
| 5,874,018 A | 2/1999 | Ferrar et al. |
| 5,876,889 A | 3/1999 | Nakamura et al. |
| 6,294,301 B1 | 9/2001 | Sorriero et al. |

FOREIGN PATENT DOCUMENTS

| | | |
|---|---|---|
| EP | 0 762 220 A2 | 3/1997 |
| GB | 2 073 211 A | 10/1981 |

OTHER PUBLICATIONS

Database WPI, XP 002176604 & JP 59 176750 A, Oct. 6, 1984 Abstract.
Patent Abstracts of Japan, & JP 63 132251 A, Jun. 4, 1988 Abstract.
Sorenson et al., "Preparative Methods of Polymer Chemistry", pp. 113–116 and 62–64, InterScience Publishing, Inc. (1961) N.Y.N.Y.
Phadke, "Quality Engineering Using Robust Design", p131, Prentice Hall (1989).

Primary Examiner—John Goodrow

(57) ABSTRACT

Disclosed are photoconductive elements including a conductive support, e.g., an electrically conductive film, drum, or belt, on which a negatively chargeable photoconductive layer is disposed. An electrical barrier layer is disposed between the conductive support and the photoconductive layer. The barrier layer provides a high energy barrier to the injection of positive charges, but transports electrons under an applied electric field. In embodiments, the barrier layer can transport charge by electronic, or both electronic and ionic mechanisms, and, is not substantially affected by humidity changes. The barrier layer includes a polyester-co-imides, polyesterionomer-co-imides, or polyamide-co-imides having covalently bonded as repeat units in the polymer chain, aromatic tetracarbonylbisimide groups of the formula:

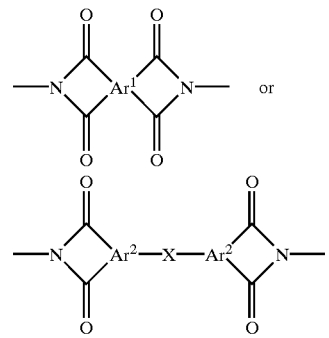

wherein $Ar^1$ and $Ar^2$ respectively represent tetravalent or trivalent aromatic groups of 6 to about 20 carbon atoms, and X is O, $C(CF_3)_2$, S=O or $SO_2$.

65 Claims, 5 Drawing Sheets

PHOTOCONDUCTIVE ELEMENTS HAVING A POLYMERIC BARRIER LAYER

CROSS REFERENCE TO RELATED APPLICATIONS

This application claims benefit under 35 U.S.C. §120 and is a continuation-in-part of U.S. Ser. No. 09/574,775, filed May 19, 2000, now U.S. Pat. No. 6,294,301 the teachings of which are incorporated herein by reference in their entirety.

FIELD OF THE INVENTION

This invention relates to electrophotography. More particularly, it relates to polymers comprising a tetracarbonylbisimide group and to photoconductive elements that contain an electrical charge barrier layer comprised of said polymers.

BACKGROUND OF THE INVENTION

Photoconductive elements useful, for example, in electrophotographic copiers and printers are composed of a conducting support having a photoconductive layer that is insulating in the dark but becomes conductive upon exposure to actinic radiation. To form images, the surface of the element is electrostatically and uniformly charged in the dark and then exposed to a pattern of actinic radiation. In areas where the photoconductive layer is irradiated, mobile charge carriers are generated which migrate to the surface and dissipate the surface charge. This leaves in non-irradiated areas a charge pattern known as a latent electrostatic image. The latent image can be developed, either on the surface on which it is formed or on another surface to which it is transferred, by application of a liquid or dry developer containing finely divided charged toner particles.

Photoconductive elements can comprise single or multiple active layers. Those with multiple active layers (also called multi-active elements) have at least one charge-generation layer and at least one n-type or p-type charge-transport layer. Under actinic radiation, the charge-generation layer generates mobile charge carriers and the charge-transport layer facilitates migration of the charge carriers to the surface of the element, where they dissipate the uniform electrostatic charge and form the latent electrostatic image.

Also useful in photoconductive elements are charge barrier layers, which are formed between the conductive layer and the charge generation layer to restrict undesired injection of charge carriers from the conductive layer. Various polymers are known for use in barrier layers of photoconductive elements. For example, Hung, U.S. Pat. No. 5,128,226, discloses a photoconductor element having an n-type charge transport layer and a barrier layer, the latter comprising a particular vinyl copolymer. Steklenski, et al. U.S. Pat. No. 4,082,551, refers to Trevoy U.S. Pat. No. 3,428,451, as disclosing a two-layer system that includes cellulose nitrate as an electrical barrier. Bugner et al. U.S. Pat. No. 5,681,677, discloses photoconductive elements having a barrier layer comprising certain polyester ionomers. Pavlisko et al, U.S. Pat. No. 4,971,873, discloses solvent-soluble polyimides as polymeric binders for photoconductor element layers, including charge transport layers and barrier layers.

The known barrier layer materials have certain drawbacks, especially when used with negatively charged elements having p-type charge transport layers. Thus, a negative surface charge on the photoconductive element requires the barrier material to provide a high-energy barrier to the injection of positive charges (also known as holes) and to transport electrons under an applied electric field. Many known barrier layer materials are not sufficiently resistant to the injection of positive charges from the conductive support of the photoconductive element. Also, for many known barrier materials the mechanism of charge transport is ionic. This property allows for a relatively thick barrier layer for previously known barrier materials, and provides acceptable electrical properties at moderate to high relative humidity (RH) levels. Ambient humidity affects the water content of the barrier material and, hence, its ionic charge transport mechanism. Thus, at low RH levels the ability to transport charge in such materials decreases and negatively impacts film electrical properties. A need exists for charge barrier materials that transport charge by electronic as well as ionic mechanisms so that films are not substantially affected by humidity changes.

Still further, a number of known barrier layer materials function satisfactorily only when coated in thin layers. As a consequence, irregularities in the coating surface, such as bumps or skips, can alter the electric field across the surface. This in turn can cause irregularities in the quality of images produced with the photoconductive element. One such image defect is caused by dielectric breakdowns due to film surface irregularities and/or non-uniform thickness. This defect is observed as toner density in non-image areas, also known as background density.

Photoconductive elements typically are multi-layered structures wherein each layer, when it is coated or otherwise formed on a substrate, needs to have structural integrity and desirably a capacity to resist attack when a subsequent layer is coated on top of it or otherwise formed thereon. Such layers are typically solvent coated using a solution with a desired coating material dissolved or dispersed therein. This method requires that each layer of the element, as such layer is formed, should be capable of resisting attack by the coating solvent employed in the next coating step.

Accordingly, a need exists for a negatively chargeable photoconductive element having a p-type photoconductor, and including an electrical barrier layer that can be coated from an aqueous or organic medium, that has good resistance to the injection of positive charges, can be sufficiently thick that minor surface irregularities do not substantially alter the field strength, and resists hole transport over a wide humidity range. Still further, a need exists for photoconductive elements wherein the barrier layer is substantially impervious to, or insoluble in, solvents used for coating other layers, e.g., charge generation layers, over the barrier layer.

Photoconductive elements comprising a photoconductive layer formed on a conductive support such as a film, belt or drum, with or without other layers such as a barrier layer, are also referred to herein, for brevity, as photoconductors.

SUMMARY OF THE INVENTION

The above objects and advantages can be attained by the present invention, which relates to photoconductive elements comprising an electrically conductive support, an electrical barrier layer and, disposed over the barrier layer, a charge generation layer capable of generating positive charge carriers when exposed to actinic radiation. The electrical barrier layer, which restrains injection of positive charge carriers from the conductive support, comprises a condensation polymer having as a repeating unit a planar, electron-deficient, tetracarbonylbisimide group. Without wishing to be bound by theory, it is believed that such bisimide group can transport charge primarily by electronic rather than ionic transport mechanisms.

In addition to the tetracarbonylbisimide group, in embodiments, the condensation polymer further comprises an ionic moiety, such as the polyesterionomer-co-imides described more fully hereinbelow and in our parent application, U.S. Ser. No. 09/574,775, filed May 19, 2000. While not wishing to be bound by theory, it is believed that the ionic moiety is capable of imparting ionic transport characteristics to the condensation polymer. Thus, by combining the tetracarbonylbisimide group with an ionic moiety, it is believed that the resulting condensation polymer is capable of transporting charge by both ionic and electronic mechanisms and thereby provides acceptable performance across a wider range of RH levels as shown in the illustrative examples that follow hereinafter. In some preferred embodiments which incorporate said ionic moiety, as more fully described hereinafter, the condensation polymer can include an ether repeat unit in the polymer backbone, which unit can impart desirable mechanical and/or electrical properties into the electrical barrier layer.

More specifically, in the photoconductive element of the invention, said barrier layer comprises a condensation polymer having covalently bonded as repeating units in the polymer chain, aromatic tetracarbonylbisimide groups of the formula:

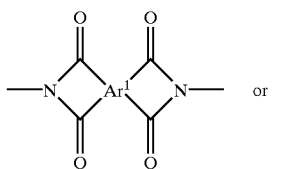 or

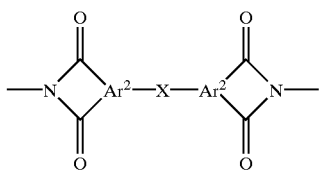

wherein $Ar^1$ and $Ar^2$ represent, respectively, tetravalent or trivalent aromatic groups of 6 to about 20 carbon atoms and X is O, $C(CF_3)_2$, S=O or $SO_2$.

More specifically, in embodiments, the barrier layer polymer is a polyester-co-imide, polyesterionomer-co-imide, or polyamide-co-imide that contains an aromatic tetracarbonylbisimide group, and has the formula:

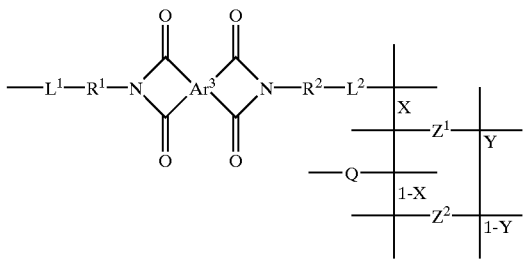

wherein:

Q represents one or more groups selected from:

(a) an alkylenedioxy, aromatic dicarboxyl, and aromatic diamino groups having from about 2 to about 36 carbon atoms;

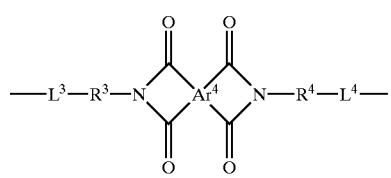 (b)

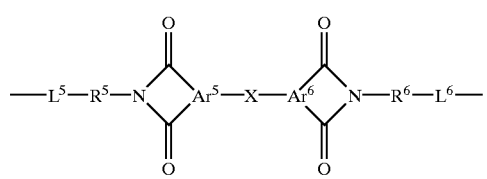 (c)

and

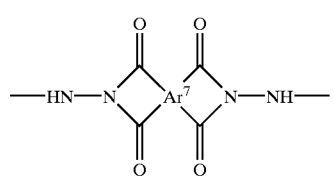 (d)

and where:

$Ar^3$, $Ar^4$, and $Ar^7$ independently represent a tetravalent aromatic group having from about 6 to about 20 carbon atoms;

$Ar^5$ and $Ar^6$ independently represent a trivalent aromatic group having from about 6 to about 12 carbon atoms;

$R^1$, $R^2$, $R^3$, $R^4$, $R^5$, and $R^6$ independently represent alkylene or alkyleneoxy groups having from about 2 to about 12 carbon atoms;

$L^1$, $L^2$, $L^3$, $L^4$, $L^5$, and $L^6$ independently represent O, CO, $CO_2$, or NH;

$Z^1$ and $Z^2$ independently represent an alkylenedioxy or alkylenediamino group having from about 2 to about 36 carbon atoms;

X is O, $C(CF_3)_2$, S=O or $SO_2$; and x and y represent mole fractions, x being the mole fraction of the group that contains $Ar^3$ and y being the mole fraction of the group, $Z^1$; and wherein x is from about 0.05 to 1 and y is from 0 to about 0.95.

In other embodiments, the photoconductive element comprises an electrically conductive support, an electrical barrier layer and, disposed over the barrier layer, a charge generation layer capable of generating positive charge carriers when exposed to actinic radiation. The barrier layer comprises a polyesterionomer-co-imide condensation polymer, which includes as a repeating unit, a planar, electron-deficient, aromatic tetracarbonylbisimide group.

In some preferred embodiments, the barrier layer polymer is a polyesterionomer-co-imide represented by the formula:

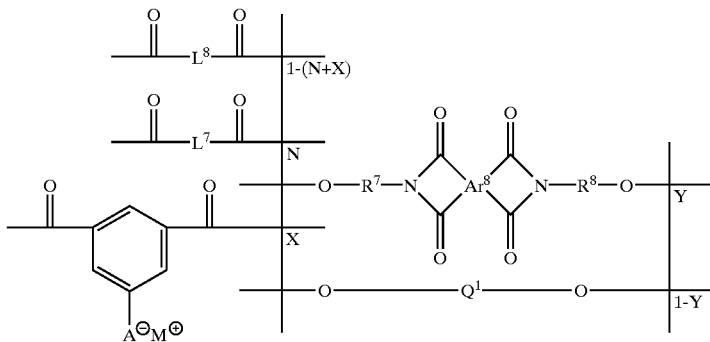

wherein:

Ar$^8$ is a tetravalent aromatic group having from about 6 to about 20 carbon atoms;

Q$^1$ represents an alkyleneoxy group having from about 2 to about 36 carbon atoms;

R$^7$ and R$^8$ independently represent alkylene or alkyleneoxy groups having from about 2 to about 12 carbon atoms;

L$^7$ represents an aromatic moiety having from about 6 to about 20 carbon atoms;

L$^8$ represents a saturated or unsaturated, linear, branched, and or cyclic aliphatic group having from about 2 to about 24 carbon atoms;

A– represents an ionic moiety selected from sulfonates, phosphonates, sulfonamides, or bissulfonamides;

M$^+$ represents a counterion selected from alkali metal, ammonium, or phosphonium cations;

Y is a mole fraction having a value of from about 0.05 to 1;

X is a mole fraction having a value of from about 0.2 to about 0.8; and

N is a mole fraction having a value of from 0 to about 0.8.

The barrier layer polymers described above are also preferably substantially insoluble in solvents used for coating the charge generation layer over the electrical barrier layer under the coating conditions employed. The preferred polyesterionomer-co-imides described above can also generally resist both swelling and solubilization during the time frame for the coating step associated with formation of the charge generation layer.

BRIEF DESCRIPTION OF THE DRAWINGS

The invention is described in more detail by reference to the drawings, of which.

DETAILED DESCRIPTION OF THE INVENTION

Figure 1:
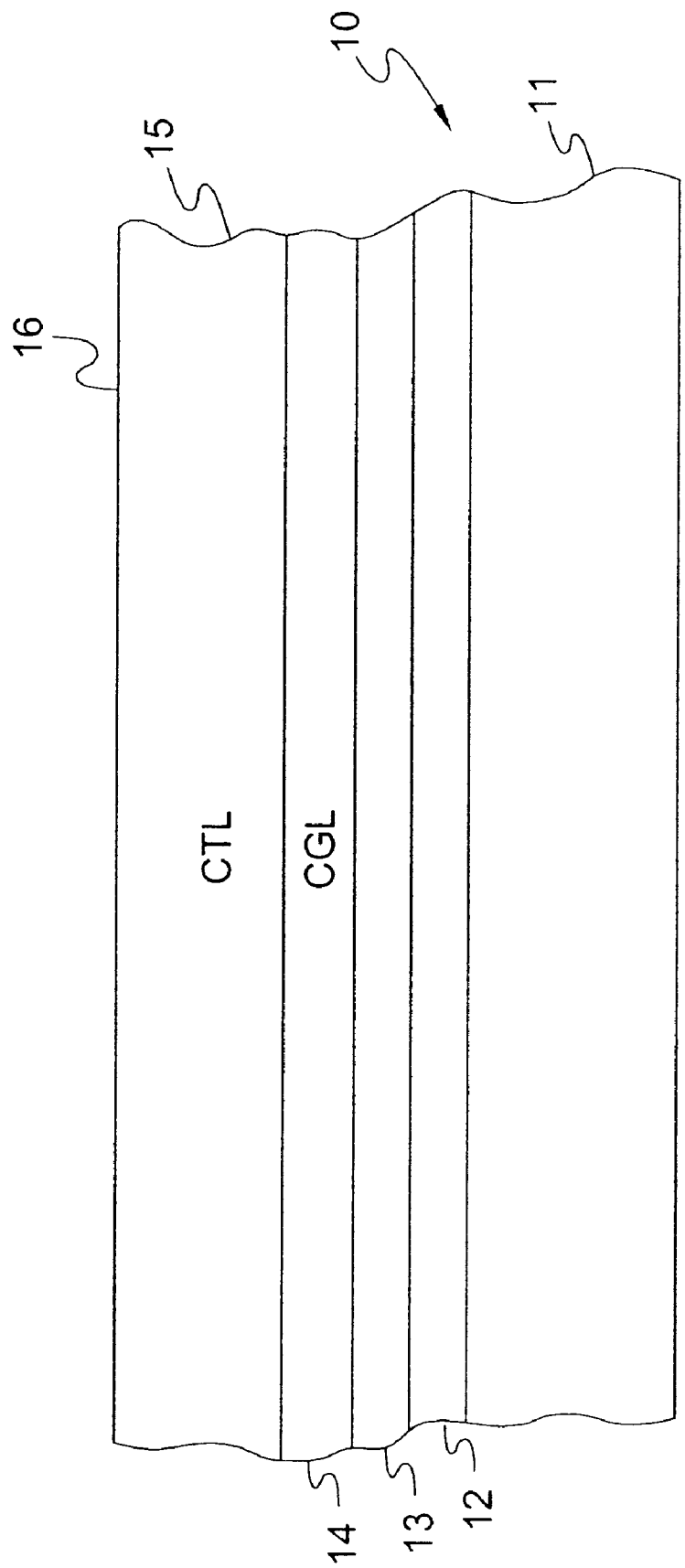
FIG. 1 is a schematic cross section, not to scale, for one embodiment of a photoconductive element according to the invention.

As illustrated in FIG. 1, an embodiment of a photoconductive element 10 of the invention comprises a flexible polymeric film support 11. On this support is coated an electrically conductive layer 12. Over the conductive layer 12 is coated a polymeric barrier layer 13, the composition of which is indicated above and described more fully hereinafter. Over the barrier layer 13 is coated a charge generation layer 14, and over the latter is coated a p-type charge transport layer 15. The p-type charge transport layer 15 is capable of transporting positive charge carriers generated by charge generation layer 14 in order to dissipate negative charges on the surface 16 of the photoconductive element 10.

The barrier and other layers of the photoconductive element are coated on an "electrically-conductive support," by which is meant either a support material that is electrically-conductive itself or a support material comprising a non-conductive substrate, such as support 11 of the drawing, on which is coated a conductive layer 12, such as vacuum deposited or electroplated metals, such as nickel. The support can be fabricated in any suitable configuration, for example, as a sheet, a drum, or an endless belt. Examples of "electrically-conductive supports" are described in Bugner et al, U.S. Pat. No. 5,681,677, the teachings of which are incorporated herein by reference in their entirety.

The barrier layer composition can be applied to the electrically conductive substrate by coating the substrate with an aqueous dispersion or solution of the barrier layer polymer using, for example, well known coating techniques, such as knife coating, spray coating, swirl coating, extrusion hopper coating, or the like. In addition to water, other solvents which are suitable are polar solvents, such as alcohols, like methanol, ethanol, propanol, iso-propanol, and mixtures thereof. As indicated in the examples hereinafter, such polar solvents can also include ketones, such as acetone, methylethylketone, methylisobutylketone, or mixtures thereof. After application to the conductive support, the so-coated substrate can be air dried. It should be understood, however, that, if desired, the barrier layer polymers can be coated as solutions or dispersions in organic solvents, or mixtures of such organic solvents and water, by solution coating techniques known in the art.

Typical solvents for solvent coating a photoconductive charge generation layer over a charge barrier layer are disclosed, for example, in Bugner et al., U.S. Pat. No. 5,681,677; Molaire et al., U.S. Pat. No. 5,733,695; and Molaire et al., U.S. Pat. No. 5,614,342, the teachings of which are all incorporated herein by reference in their entirety. As these references indicate, the photoconductive material, e.g., a photoconductive pigment, is solvent coated by dispersing it in a binder polymer solution. Commonly used solvents for this purpose include chlorinated hydrocarbons, such as dichloromethane, as well as ketones and tetrahydrofuran. A problem with known barrier layer compositions is that such solvents for the coating of the photoconductive or charge generation layer will also dissolve or damage the barrier layer. An advantage of the barrier layer compositions of the invention, especially those comprising a polyesterionomer-co-imide or a polyamide-co-imide, is that they are not substantially dissolved or damaged by chlorinated hydrocarbons or the other commonly used solvents for coating photoconductor or charge generation layers, at the temperatures and for the time periods employed for coating such layers.

Certain of the barrier layer polymers of the invention can be dissolved in mixtures of dichloromethane with a polar solvent such as methanol or ethanol, as will be seen from working examples hereinafter. However, the barrier layer polymers of the invention, especially the polyesterionomer-co-imide and polyamide-co-imide species, do not dissolve substantially in chlorinated hydrocarbons, e.g., dichloromethane or in ketones such as dialkylketones or in tetrahydrofuran. By "substantially insoluble", it is meant dissolving to the extent of less than 0.1 mg/100 ml of solvent at 25° C. over a period of 5 minutes.

Another advantage of the polymers employed in barrier layers in accordance with the invention is that in addition to their other advantages they can be made from more readily available starting materials than can the polyimides of Pavlisko et al., U.S. Pat. No. 4,971,873 and that the starting materials can be selected to yield a polymer that is either substantially insoluble or soluble in particular solvents.

The preferred embodiments of the present invention further comprise multi-active photoconductive elements having separate charge generation layers and charge transport layers; such elements provide superior photographic speed and benefit the most from the use of a barrier layer to restrain migration of positive charge carriers from the conductive support. However, it should be understood that the invention also includes single layer photoconductive elements having a barrier layer between the conductive support and the photoconductive layer. Even with such single layer elements, injection of positive charges from the conductive support is a problem. Hence, the inclusion of a barrier layer in accordance with the invention provides a valuable improvement.

Further to the foregoing, the present invention encompasses photoconductive elements that transport positive charge carriers, generated by a charge generation layer, to dissipate surface negative charges. In this regard, the present invention encompasses multi-active photoconductive elements, and also single layer photoconductive elements, that transport positive charge carriers, generated by a charge generation layer, to dissipate surface negative charges.

The compositions of, the locations, and methods for forming the photoconductive charge generating layer, the charge transport layer, and other components of the photoconductive element of the invention can be as described in Bugner et al. U.S. Pat. No. 5,681,677 cited above and incorporated herein by reference in its entirety.

A preferred conductive support for use in electrophotographic and laser copiers or printers is a seamless, flexible cylinder or belt of polymer material on which nickel can be electroplated or vacuum deposited. Other useful supports include belts or cylinders with layers of other metals, such as stainless steel or copper, deposited thereon. Such conductive supports have important advantages, but at least one drawback for which the barrier layer compositions of the invention, and particularly certain preferred polyesterionomer-co-imide polymers as described more fully hereinafter, provide a solution. The deposited nickel layers often have bumps or other irregularities which, when the barrier layer is thin, can cause an irregular electric field strength across the surface and thus cause defects, electrical breakdown, or so-called black spots in the resulting image. Thus, irregularities on the electrically conductive support make it desirable to have a barrier layer which can be coated at thicknesses which are adequate to smooth out this surface roughness. As an advantage over conventional barrier materials, the barrier materials of the present invention can be formed in relatively thick layers and still have desired electrophotographic properties. As a relatively thick layer, e.g., greater than about 0.5 micron, desirably greater than about 1 micron, preferably greater than about 2 microns, and more preferably greater than about 3 microns, and most preferably greater than about 4 microns, the barrier layer of the invention can act as a smoothing layer and compensate for such irregularities. In particular, the preferred polyesterionomer-co-imides described below can be coated as a barrier layer with thicknesses greater than those disclosed in parent application, Ser. No. 09/574,775 filed May 19, 2000, and still have good performance.

The barrier layer polymer employed is a condensation polymer that contains as a repeating unit a planar, electron-deficient aromatic tetracarbonylbisimide group as defined above. More specifically, in embodiments, the barrier layer polymer comprises a polyester-co-imide, polyesterionomer-co-imide, or polyamide-co-imide which contains an aromatic tetracarbonylbisimide group, and has the formula:

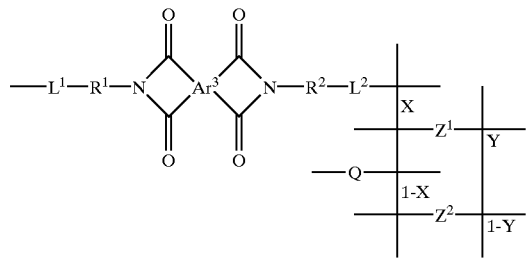

wherein:

Q represents one or more groups selected from:
(a) an alkylenedioxy, aromatic dicarboxyl, and aromatic diamino groups having from about 2 to about 36 carbon atoms;

(b)
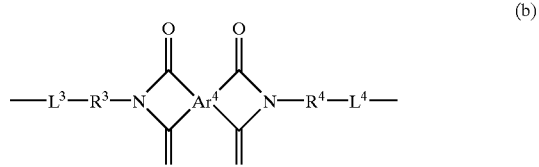

(c)
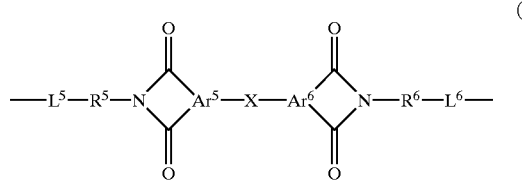

and

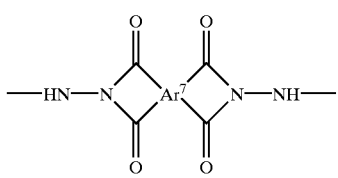

and where:

Ar³, Ar⁴, and Ar⁷ independently represent a tetravalent aromatic group having from about 6 to about 20 carbon atoms;

Ar⁵ and Ar⁶ independently represent a trivalent aromatic group having from about 6 to about 12 carbon atoms;

$R^1$, $R^2$, $R^3$, $R^4$, $R^5$, and $R^6$ independently represent alkylene or alkyleneoxy groups having from about 2 to about 12 carbon atoms;

$L^1$, $L^2$, $L^3$, $L^4$, $L^5$, and $L^6$ independently represent O, CO, $CO_2$, or NH;

$Z^1$ and $Z^2$ independently represent an alkylenedioxy or alkylenediamino group having from about 2 to about 36 carbon atoms;

X is O, $C(CF_3)_2$, S=O or $SO_2$; and x and y represent mole fractions, x being the mole fraction of the group that contains Ar³ and y being the mole fraction of the group, $Z^1$; and wherein x is from about 0.05 to 1 and y is from 0 to about 0.95.

The barrier layer polymers in accordance with the invention thus contain planar, electron-deficient aromatic, functionalized bisimide groups in which the aromatic group is preferably a tri- or tetravalent benzene, perylene, naphthalene or anthraquinone nucleus. In addition to the carbonyl groups, aromatic groups in the foregoing structural formulas can have other substituents thereon, such as $C_{1-6}$ alkyl, $C_{1-6}$ alkoxy, or halogens.

Examples of useful imide structures include 1,2,4,5-benzenetetracarboxylic-bisimides:

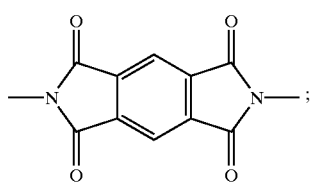

1,4,5,8-naphthalenetetracarboxylic-bisimides:

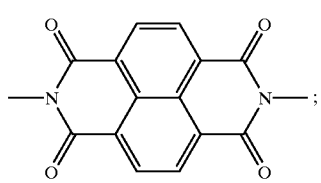

3,4,9,10-perylenetetracarboxylic-bisimides:

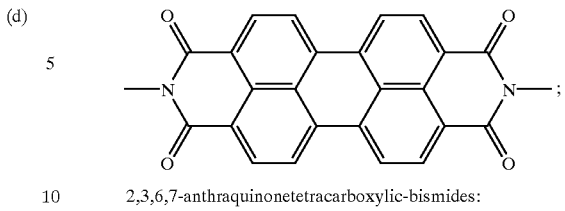

2,3,6,7-anthraquinonetetracarboxylic-bismides:

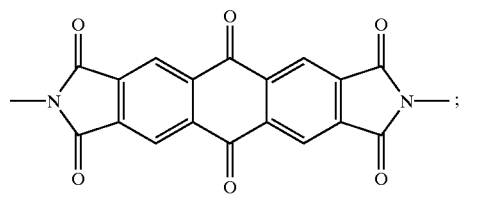

and hexafluoroisopropylidene-2,2',3,3'-benzenetetracarboxylic-bisimides:

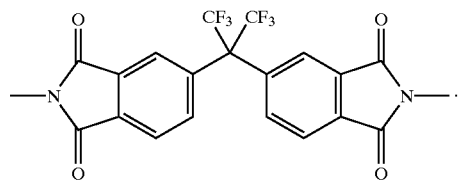

Especially preferred are those with a fused ring system, such as naphthalenetetracarbonylbisimides and perylenetetracarbonylbisimides, as in many instances they are believed to transport electrons more effectively than a single aromatic ring structure. The preparation of such tetracarbonylbisimides is known and described, for example, in U.S. Pat. No. 5,266,429, the teachings of which are incorporated herein by reference in their entirety. These moieties are especially useful when incorporated into polyester-co-imides, polyesterionomer-co-imides, and polyamide-co-imides as the sole electron-deficient moiety or when incorporated into such polymers in various combinations. The mole percent concentration of the electron deficient moiety in the polymer can desirably range from about 2.5 mol % to 100 mol %, preferably from about 5 mol % to 100 mol %, with a more preferred range being from about 10 mol % to about 80 mol %.

For preferred polyesterionomer-co-imides described hereinafter, as exemplified in Examples 18–56 hereinafter, in general, higher levels of tetracarbonylbisimide in the condensation polymer yield more desired dark decay properties; namely, generally lower and stable, i.e., more consistent, values for dark decay, when the composition is used as a barrier layer. Accordingly, the electron-deficient moiety in such polymers is more preferably from about 10 mol% to about 80 mol%, and even more preferably from about 25 to about 75 mol%, based on total diol content.

In some preferred embodiments, the barrier layer polymer in the photoconductive element of the invention is a polyesterionomer-co-imide comprising an aromatic tetracarbonylbisimide group and represented by the formula:

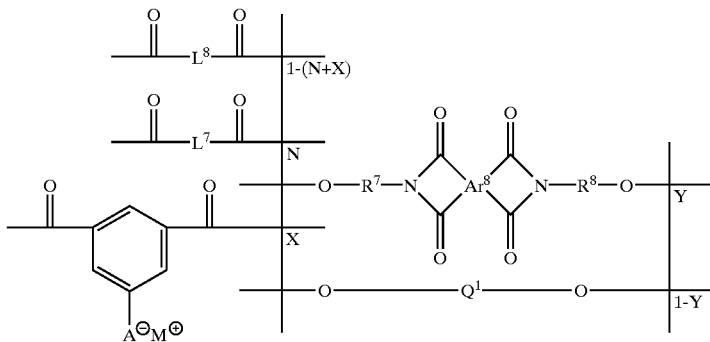

wherein:

- $Ar^8$ is a tetravalent aromatic group having from about 6 to about 20 carbon atoms;
- $Q^1$ represents an alkyleneoxy group having from about 2 to about 36 carbon atoms;
- $R^7$ and $R^8$ independently represent alkylene or alkyleneoxy groups having from about 2 to about 12 carbon atoms;
- $L^7$ represents an aromatic moiety having from about 6 to about 20 carbon atoms;
- $L^8$ represents a saturated or unsaturated, linear, branched, and or cyclic aliphatic group having from about 2 to about 24 carbon atoms;
- A− represents an ionic moiety selected from sulfonates, phosphonates, sulfonamides, or bissulfonamides;
- $M^+$ represents a counterion selected from alkali metal, ammonium, or phosphonium cations;
- Y is a mole fraction, based upon total diol content, of the tetracarbonylbisimide group and having a value of from about 0.05 to 1, preferably from about 0.1 to about 0.8, more preferably from about 0.25 to about 0.75;
- X is a mole fraction, based on total acid content, and having a value of from about 0.2 to about 0.8, preferably from about 0.3 to about 0.6, and more preferably from about 0.35 to about 0.5; and
- N is a mole fraction having a value of from 0 to about 0.8, preferably from about 0.2 to about 0.5.

Examples of specific dicarbonyl groups, alkylenedioxy groups and alkylene groups that are suitable in the barrier layer polymers for photoconductive elements of the invention are cited in Sorreiro et al., U.S. Pat. No. 5,266,429, the teachings of which have previously been incorporated herein by reference.

The barrier layer polymers in accordance with the invention are prepared by condensation of at least one diol or diamine compound with at least one dicarboxylic acid, ester, anhydride, chloride or mixtures thereof. Such polymers can have a weight-average molecular weight of 2,500 to 250,000, preferably 5,000 to 200,000, and more preferably from about 10,000 to about 150,000.

The bisimide structure containing the tetravalent-aromatic nucleus can be incorporated either as a diol or diacid by reaction of the corresponding tetracarbonyldianhydride with the appropriate amino-alcohol or amino-acid. The resulting bisimide-diols or bisimide-diacids may then by polymerized, condensed with diacids, diol, or diamines, to prepare the barrier layer polymers by techniques well-known in the art, such as interfacial, solution, or melt polycondensation. A preferred technique is melt-phase polycondensation as described by Sorensen and Campbell, in "Preparative Methods of Polymer Chemistry," pp. 113–116 and 62–64, Interscience Publishing, Inc. (1961) New York, N.Y. Preparation of bisimides is also disclosed in U.S. Pat. No. 5,266,429, previously incorporated by reference.

Preferred diesters, diacids and dianhydrides for preparing the barrier layer polymers include terephthalic acid, dimethylisophthalate, isophthalic acid, maleic acid, 2,6-naphthanoic acid, 5-t-butylisophthalic acid, 1,4-cyclohexanedicarboxylic acid, 1,4-dimethylcyclohexanedicarboxylate (both the cis- and trans-isomers thereof), 1,1,3-trimethyl-3-(4-carboxyphenyl)-5-indancarboxylic acid, pyromellitic dianhydride, maleic anhydride, dimethyl succinate, dimethyl glutarate, dimethyl azelate, dimethyl adipate, dimethyl sebacate, dodecanediodic acid, and 1-methylsuccinic acid.

A preferred type of monomer are diesters, diacids and dianhydrides which comprise a divalent cyclohexyl moiety, such as 1,4-dimethylcyclohexanedicarboxylate, including both the cis- and trans-isomers thereof. These monomers are commercially available from Eastman Chemical Company of Kingsport, Tenn., and are available in the essentially pure trans-isomer form, as well as a mixture of both the cis- and trans-isomer forms (70/30 mole % mix of cis/trans-isomers respectively). This type of aliphatic monomer generally has more desirable electrical properties, such as lower dark decay levels, relative to other aliphatic monomers. It also provides an aliphatic moiety in the resulting polymer which is believed to be more resistant to degradation when the polymer is maintained in a coating solution for extended periods of time.

Preferred diols and their equivalents for preparing the barrier layer polymers include ethylene glycol, polyethylene glycols, such as tetraethylene glycol, ethylene carbonate, 1,2-propanediol, 1-methyl-ethylene carbonate, 2,2'-oxydiethanol, 1,4-butanediol, 1,6-hexanediol, 1,10-decanediol, 1,4-cyclohexanedimethanol, 2,2-dimethyl-1,3-propanediol, and 4,4-isopropylidene-bisphenoxy-ethanol. In some preferred embodiments, polyethylene glycols, such as tetraethylene glycol, are added which allow for formation of a condensation polymer with ether repeat units in the polymer backbone that impart flexibility, i.e., toughness into the polymer, and, therefore, provide resistance to cracking of the photoconductor over time. Further, the ether repeat unit provided by using polyethylene glycols as a monomer also can result in increased electrical performance, such as in generally lower levels of residual, i.e., toe voltage. Preferred polyethylene glycols have a molecular weight of less than about 600, and more preferably less than about 300.

The polyesterionomer-co-imides exemplified in the examples which follow hereinafter contain a 5-sodiosulfoisophthalic acid ionomeric moiety derived from dimethyl-5-sodiosulfoisophthalate, but the present invention should be understood as not limited to this composition. In general, ionomers that can be suitably employed to introduce desired ionomeric moieties for the polyesterionomer-co-imides according to the invention, are those wherein the diester, or diacid functional groups are associated with a central aromatic moiety which can be phenyl, diphenylether, naphthyl, or biphenyl, but is preferably a divalent phenyl moiety, such as that exemplified in a 5-sodiosulfoisophthalic acid moiety. The ionic group substituent or substituents to the central aromatic moiety can be selected from sulfonates, phosphonates, sulfonamides, or bissulfonamides. Preferably, the ionic group is a sulfonate group. The ionic group has an associated counterion that can be selected from alkali metal, ammonium, or phosphonium cations. Examples of suitable counterion are lithium, sodium, potassium, cesium, trimethylammonium, triethylammonium, diethylhydroxyethylammonium, dihydroxyethylethylammonium, triphenylmethylphosphonium, and mixtures thereof.

Also suitable are ionomers derived from, for example, dimethyl-3,3'-iminobis-sodiosulfonyl-benzoate, dimethyl-5-(N-potassio-p-toluenesulfonylamido)sulfonyl-isophthalate, and dimethyl-5-(4-sodiosulfonxy)isophthlate. Sodium is an especially preferred counterion.

For the preferred polyesterionomer-co-imides of the invention, using relatively large amounts of ionomer in preparation of the condensation polymer will allow for coating a relatively thick layer, which as described above, is desired to smooth out surface irregularities on the conductive support. A thicker barrier layer will also generally have lower residual (toe) voltage, and can also reduce back spots. In general, the amount of ionomeric monomer employed is preferably from about 20 to about 80 mol % based on total acid content, with an amount of from about 30 mol % to about 60 mol % being preferred, and from about 35 mol % to about 50 mol % being even more preferred. At such high amounts of the ionomeric monomer content, it is especially preferred to use relatively high levels of tetracarbonylbisimide content, such as the preferred level of from about 25 to 75 mol % previously mentioned herein, as use of higher amounts of the ionomeric monomer can promote higher levels of dark decay, which can be offset by use of the larger amounts of tetracarbonylbisimide content.

The described polymers are all good film formers and exhibit excellent adhesion to most substrates of interest. These polymers resist attack by the solvent employed for the next film layer, in this case the solvent for the charge-generation-layer (CGL). Resistance to CGL-solvent renders the barrier layer essentially intact and results in controlled thickness as well as reproducible film electrical properties. A factor in achieving solvent resistance is the level of ionomeric moiety employed, i.e., the 5-sodiosulfoisophthalic acid moiety for example, which is incorporated into the polymer. In general, the ionomeric monomer should be present at a level of at least about 30 mol % of the total acid portion of the polymer. This level of ionomeric moiety can render the resulting polyesterionomer-co-imide dispersible or soluble in water or other polar solvents, such as methanol, ethanol, propanol (iso- or normal propanol), or mixtures of such solvents with water. However, barrier layers formed from such polyester ionomers are not marred by overcoating with non-polar organic solvents typically used to coat the charge generation layer, such as the chlorinated hydrocarbons, like dichloromethane or 1,1,2-trichloroethylene.

The condensation polymers of the invention also yield barrier layers having significantly reduced dielectric breakdown or black spots.

The following examples further illustrate the invention and are merely intended to illustrate specific embodiments and should not be construed as limiting the scope thereof. Unless otherwise indicated, all parts and percentages are by weight and temperatures are in degrees Celsius (° C.).

SPECIFIC EMBODIMENTS OF THE INVENTION

Polyester-Co-Imide Examples

The polyester-co-imide examples are all prepared by known melt phase polycondensation techniques as documented by Sorenson et al, cited above, pp. 113–116.

Polymer A

Poly[1,4,5,8-naphthalenetetracarbonyl-bisimido-2-ethoxyethylene-co-2,2-dimethyl-1,3-propylene (50/50) isophthalate]

A mixture of 194 g (1.00 mole) of dimethylisophthalate, 72.8 g (0.70 mole) of 2,2-dimethyl-1,3-propanediol, and 221 g (0.50 mole) of 1,4,5,8-naphthalenetetracarbonyl-bis(2-hydroxyethoxyethyl)imide contained in a polymerization flask equipped with a Claisen head and a nitrogen inlet tube is heated to 200° C. under a nitrogen atmosphere to produce a burgundy-colored, transparent, homogeneous melt. Then 100 ppm of titanium isopropoxide catalyst is added, and the temperature is slowly raised to 280° C. over several hours. Heating is continued until no further evolution of methanol can be detected. A mechanical stirrer is introduced, and the flask is connected to a source of vacuum. The mixture is stirred under vacuum at 280° C. for about two hours, then cooled to room temperature. The polymerization product is removed from the reaction vessel and submitted for assay. Polymer A has an inherent viscosity in dichloromethane of 0.65 dl/g, a glass transition temperature of 74° C., and a weight average molecular weight of 64,000.

Polymer B

Poly[1,4,5,8-naphthalenetetracarbonylbisimido-pentamethylene-co-2,2-dimethyl-1,3-propylene-co-ethylene (25/25/50) terephthalate]

A mixture of 194 g (1.00 mole of dimethylterephthalate, 109.5 g (0.25 mole) of 1,4,5,8-naphthalenetetracarbonyl-bis (5-hydroxypentyl)imide, 36.4 g (0.35 mole) of 2,2-dimethyl-1,3-propanediol, and 21.7 g (0.35 mole) of ethylene glycol are combined in a polymerization flask as per the procedure of Polymer A. The resulting Polymer B has an inherent viscosity of 0.62 dl/g, a glass transition temperature of 93° C., and a weight average molecular weight of 72,000.

Polymer C

Poly[1,4,5,8-naphthalenetetracarbonyl-bisimido-5-pentamethylene-co-ethylene (50/50) terephthalate]

A mixture of 194 g (1.00 mole) of dimethylterephthalate, 219 g (0.50 mole) of 1,4,5,8-naphthalenetetracarbonyl-bis (5-hydroxypentyl)imide and 43.4 g (0.70 mole) of ethylene glycol are combined in a polymerization flask as per the procedure of Polymer A. The resulting Polymer C has an inherent viscosity of 0.54 dl/g, a glass transition temperature of 92° C., and a weight average molecular weight of 56,000.

The polyester-co-imide examples described above are listed in Table I along with their respective responses to varying relative humidity (RH). The responses are shown as weight percent water loss, which changes the ionic conductivity of the polymer.

TABLE I

POLYESTER-CO-IMIDES

| Polymer | x | y | z | R" | R' | R | % Water Loss From 70F/60% RH To 80F/20% RH |
|---|---|---|---|---|---|---|---|
| A | 0.5 | 0 | 0.5 | —[CH$_2$]$_2$—O—[CH$_2$]$_2$— | | —H$_2$C—C(CH$_3$)(CH$_3$)—CH$_2$— | 0.038 |
| B | 0.25 | 1.00 | 0.25 | —(CH$_2$)$_2$— | —(CH$_2$)$_5$— | —H$_2$C—C(CH$_3$)(CH$_3$)—CH$_2$— | 0.087 |
| C | 0.50 | 1.00 | 0.50 | —(CH$_2$)$_2$— | —(CH$_2$)$_5$— | | 0.225 |

Polyesterionomer-Co-Imide Examples

The polyesterionomer-co-imide examples are also prepared by known melt phase polycondensation techniques as documented by Sorensen et al, cited above, pp. 113–116.

Comparative Polymer D

Poly[2,2'-oxydiethylene-co-ethylene (78/22) 5-sodiosulfoisophthalate-co-isophthalate (12/88)] is commercially available as AQ38S polymer from Eastman Chemical Company, Kingsport, Tenn. This material is tested as received and is also prepared as follows:

A mixture of 170.2 g (0.88 mole) of dimethylisophthalate, 35.5 g (0.12 moles) of dimethyl-5-sodiosulfoisophthalate, 19.1 g (0.031 mole) ethylene glycol and 86.2 g (0.78 mole) of 2,2'-oxydiethanol contained in a polymerization flask equipped with a Claisen head and a nitrogen inlet tube is heated to 200° C. under a nitrogen atmosphere to produce a clear, homogenous melt. Then 100 ppm of titanium isopropoxide catalyst is added, and the temperature slowly raised to 260° C. over several hours. Heating is continued until no further evolution of methanol can be detected. A mechanical stirrer is then introduced, and the flask connected to a source of vacuum. The mixture is stirred under vacuum at 260° C. for about two hours, then cooled to room temperature. The resulting Comparative Polymer D has an inherent viscosity of 0.68 dl/g, a glass transition temperature of 40° C., and a weight average molecular weight of 58,000.

Polymer E-1

Poly[2,2'oxydiethylene-co-1,4,5,8-naphthalene-tetracarbonyl-bisimido-5-pentamethylene (75/25) isophthalate-co-5-sodiosulfo-isophthalate (80/20)]

A mixture of 155.2 g (0.80 mole of dimethylisophthalate, 57.2 g (0.20 mole) of dimethyl-5-sodiosulfoisophthalate, 109.2 g (0.25 mole) of 1,4,5,8-naphthalenetetracarbonyl-bis (5-hydroxypentyl)imide, and 111.3 g (1.05 mole) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. The polycondensation step is substantially the same as that employed for Comparative Polymer D. The resulting Polymer E-1 has an inherent viscosity of 0.58 dl/g, a glass transition temperature of 72° C., and a weight average molecular weight of 64,000.

Polymer E-2

Poly[2,2'oxydiethylene-co-1,4,5,8-naphthalene-tetracarbonyl-bisimido-5-pentamethylene (75/25) isophthalate-co-5-sodiosulfo-isophthalate (60/40)]

The procedure employed is substantially the same as for Polymer E-1 except that the diesters consist of 116.4 g (0.60 moles) of dimethylisophthalate and 118.4 g (0.40 moles) of dimethyl-5-sodiosulfoisophthalate. The polycondensation reaction is carried out in substantially the same manner and the resulting Polymer E-2 has an inherent viscosity of 0.24 dl/g, a glass transition temperature of 92° C., and a weight average molecular weight of 16,500.

Polymer E-3

Poly[2,2'oxydiethylene-co-1,4,5,8-naphthalene-tetracarbonyl-bisimido-5-pentamethylene (75/25) isophthalate-co-5-sodiosulfo-isophthalate (50/50)]

The procedure employed is substantially the same as for Polymer E-1 except that the diesters consist of 97.0 g (0.50 moles) of dimethylisophthalate and 148.0 g (0.50 moles) of dimethyl-5-sodiosulfoisophthalate. The polycondensation reaction is carried out in substantially the same manner and the resulting Polymer E-3 has an inherent viscosity of 0.12 dl/g, a glass transition temperature of 92° C., and a weight average molecular weight of 12,500.

Polymer F

Poly[2,2'-oxydiethylene-co-1,4,5,8-naphthalenetetracarbonyl-bisimido-2-ethoxyethylene (80/20) isophthalate-co-5-sodiosulfoisophthalate (80/20)]

The procedure employed is substantially the same as for polymer E-1 except that the glycol mixture consists of 88.4 g (0.20 mole) of 1,4,5,8-naphthalenetetracarbonyl-bis(2-hydroxyethoxyethyl)imide and 118.7 g (1.12 mole) of 2,2'-oxydiethanol. The resulting Polymer F has an inherent viscosity of 0.55 dl/g, a glass transition temperature of 68° C., and a weight average molecular weight of 65,000.

Polymer G

Poly[1,4,5,8-naphthalenetetracarbonyl-bisimido-2-ethoxyethylene-co-2,2'-oxydiethylene (60/40) isophthalate-co-sodiosulfoisophthalate (80/20)]

The procedure employed is substantially the same as for Polymer E-1 except that the glycol mixture consists of 265.2 g (0.60 moles) of 1,4,5,8-naphthalenetetracarbonyl-bis(2-hydroxyethoxyethyl)imide and 59.4 g (0.56 moles) of 2,2'-oxydiethanol. The resulting Polymer G has an inherent viscosity of 0.58 dl/g, a glass transition temperature of 82° C., and a weight average molecular weight of 61,000.

Polymer H

Poly[1,4,5,8-naphthalenetetracarbonyl-bisimido-2-ethoxyethylene-co-2,2'-oxydiethylene (80/20) isophthalate-co-5-sodiosulfoisophthalate (80/20)]

The procedure employed is substantially the same as for Polymer E-1 except that the glycol mixture consists of 353.6 g (0.80 mole) of 1,4,5,8-naphthalenetetracarbonyl-bis(2-hydroxyethoxyethyl)imide and 29.7 g (0.28 mole) of 2,2'-oxydiethanol. The resulting Polymer H has an inherent viscosity of 0.54 dl/g, a glass transition temperature of 92° C., and a weight average molecular weight of 56,000.

Polymer I

Poly[1,4,5,8-naphthalenetetracarbonyl-bis-2-ethoxyethylene-co-2,2'-oxydiethylene (40/60) isophthalate-co-5-sodiosulfoisophthalate (80/20)]

The procedure employed is substantially the same as for Polymer E-1 except that the glycol mixture consists of 89.1 g (0.84 mole) of 2,2'-oxydiethanol and 176.8 g (0.40 mole) of 1,4,5,8-naphthalenetetracarbonyl bis(2-ethoxyethanol) imide. The resulting Polymer I has an inherent viscosity of 0.58 dl/g, a glass transition temperature of 79° C., and a weight average molecular weight of 105,000.

The polyesterionomer-co-imide examples described above and the response to changes in relative humidity are listed in Table II.

TABLE II

POLYESTER-IONOMERS

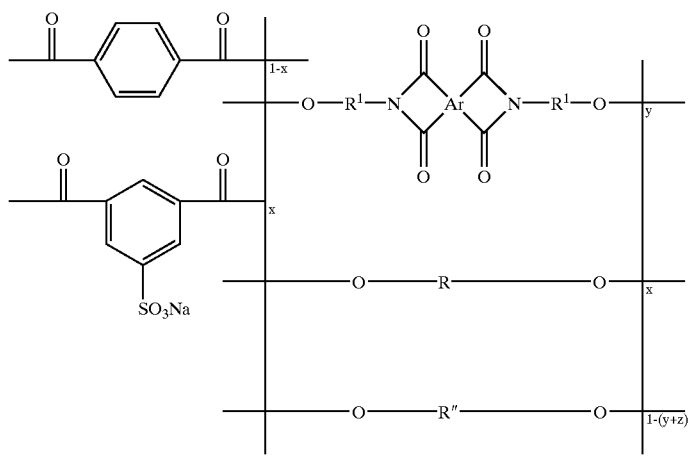

| Polymer | x | 1-x | y | 1-(y+z) | z | R | R' | R" | % Water Loss From 70F/60% RH To 80F/20% RH |
|---|---|---|---|---|---|---|---|---|---|
| Comp. Polymer D | 0.11 | 0.89 | 0 | 0.78 | 0.22 | —[CH$_2$]$_2$—O—[CH$_2$]$_2$— | | —[CH$_2$]$_2$— | |
| E-1 | 0.20 | 0.80 | 0.25 | 0 | 0.75 | —[CH$_2$]$_2$—O—[CH$_2$]$_2$— | —[CH$_2$]$_5$— | | 0.061 |

TABLE II-continued

POLYESTER-IONOMERS

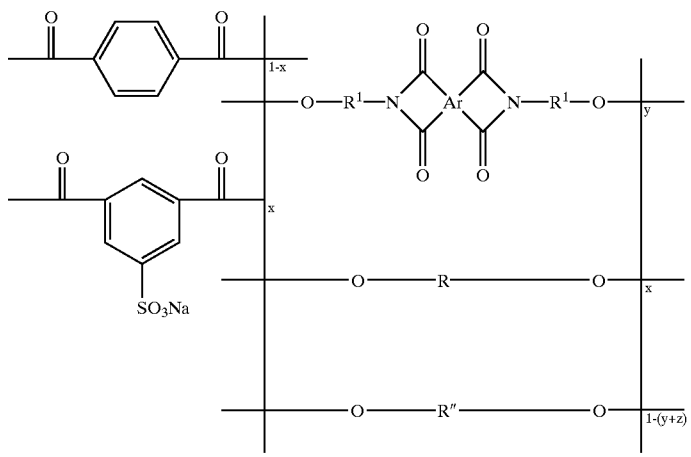

| Polymer | x | 1-x | y | 1-(y+z) | z | R | R' | R'' | % Water Loss From 70F/60% RH To 80F/20% RH |
|---|---|---|---|---|---|---|---|---|---|
| E-2 | 0.40 | 0.60 | 0.25 | 0 | 0.75 | —[CH$_2$]$_2$—O—[CH$_2$]$_2$— | —(CH$_2$)$_{15}$— | | |
| E-3 | 0.50 | 0.50 | 0.20 | 0 | 0.75 | —[CH$_2$]$_2$—O—[CH$_2$]$_2$— | —(CH$_2$)$_{15}$— | | 0.698 |
| F | 0.20 | 0.80 | 0.20 | 0 | 0.80 | —[CH$_2$]$_2$—O—[CH$_2$]$_2$— | —[CH$_2$]$_2$—O—[CH$_2$]$_2$— | | 0.179 |
| G | 0.20 | 0.80 | 0.60 | 0 | 0.40 | —[CH$_2$]$_2$—O—[CH$_2$]$_2$— | —[CH$_2$]$_2$—O—[CH$_2$]$_2$— | | 0.295 |
| H | 0.20 | 0.80 | 0.80 | 0 | 0.20 | —(CH$_2$)$_{12}$— | —[CH$_2$]$_2$—O—[CH$_2$]$_2$— | | 0.656 |
| I | 0.20 | 0.80 | 0.40 | 0 | 0.60 | —[CH$_2$]$_2$—O—[CH$_2$]$_2$— | —[CH$_2$]$_2$—O—[CH$_2$]$_2$— | | |

Polyamide-Co-Imide Examples

The novel polyamide examples of the invention are also prepared by known techniques for melt phase polycondensation, as described by Sorenson et al, cited above, pp. 62–64.

Control of reaction stoichiometry is required in order to achieve both high conversion and molecular weight. The samples of the invention are prepared by melt phase polycondensation techniques from either combinations of the appropriate diacids and diamines or the salts of these diacids and diamines.

Comparative Polymer J

This comparative polymer is a commercially available aliphatic polyamide sold under the trade name "Amilan CM8000" by the Toray Company, Ltd. of Japan. This polymer is identified in U.S. Pat. No. 5,876,889, which is incorporated herein by reference, as 6/66/610/12 copolymerized nylon. Identification of the monomers which form the 6/66/610/12 copolymer are:

Nylon 610 —[NH(CH$_2$)$_6$NHCO(CH$_2$)$_8$CO]—

Nylon 12 —[NH(CH$_2$)$_{11}$CO]—

Nylon 66 —[NH(CH$_2$)$_6$NHCO(CH$_2$)$_4$CO]—

Nylon 6 —[NH(CH$_2$)$_5$CO]—

Comparative Polymer K

Poly[dodecamethylene-co-piperazino (50/50) 1,1,3-trimethylphenylindane-co-dodecamethylene (50/50)] amide]

A mixture of 162 g (0.50 mole) of 1,1,3-trimethyl-3-(4-carboxyphenyl)-5-indancarboxylic acid, 115.15 g (0/0.50 mole) of dodecanedioic acid, 43 g (0.50 mole) of piperazine, and 100 g (0.50 mole) of dodecanediamine is combined in a polymerization flask equipped with side arm and gas inlet tube. The contents are heated to 220° C. under a positive argon atmosphere to achieve a clear, homogenous melt. The polymerization temperature is raised from 220° C. to 280° C. over a period of four hours or until the evolution of distillate terminates. The flask is then equipped with stirrer and connected to a source of vacuum. The resulting product, Comparative Polymer K, is collected as a tough, amorphous solid which has a glass transition temperature of 89° C. and a weight average molecular weight of 105,000.

Polymer L

Poly[1,3,3-trimethylcyclomethylene 1,4,5,8-naphthalenete-tracarbonyl-bis(imido-3-propylene) amide-co-dodecamethyleneamide (20/80)]amide.

A mixture of 184.2 g (0.80 moles) dodecandioic acid, 126.8 g (0.20 moles) of 1,4,5,8-naphthalenetetracarbonylbis(11-undecanoic acid)imide, and 170.3 g (1.00 moles) 5-amino-1,3,3-trimethylcyclohexanemethylamine contained in a polymerization flask equipped with a Claisen head and a nitrogen inlet tube is heated to 220° C. under a nitrogen atmosphere to produce a dark burgundy-colored, homogeneous melt. The temperature is slowly raised to 280° C. over several hours. Heating is continued until no further distillate is observed. A mechanical stirrer is introduced, and the flask is connected to a source of vacuum. The mixture is stirred under vacuum at 280° C. for about two hours, or until the desired melt viscosity is achieved, then the product is allowed to cool to room temperature. The resulting Polymer L is soluble in mixed solvents such as dichloromethane-methanol, and has a glass transition temperature of 102° C. and a weight average molecular weight of 80,000.

Polymer M

Poly[dodecamethylene-co-1,4-piperazino (35/65) 1, 4,5,8-napthalene-tetracarbonyl-bis(imido-3-propylene)amide-co-dodecamethyleneamide (90/10)]amide.

A mixture of 205.7 g (0.65 moles) dipiperazonium dodecanedioate, 107.6 g (0.25 moles), hexamethylenediammonium dodecanedioate, and 63.8 g (0.10 moles) hexamethylenediammonium 1,4,5,8-naphthalenetetracarbonyl-bisimido-3-propionate is combined and subjected to substantially the same polycondensation profile and procedure employed for Polymer L. The resulting Polymer M has solubility in mixed solvents, a crystalline melting point of 114° C. and a weight average molecular weight of 72,500.

Polymer N

Poly[1,3,3-trimethylcyclohexane-1,5-methylene 1,4,5,8-naphthalene-tetracarbonyl-bis(imido-11-undecamethylene)]amide.

A mixture of 634 g (1.00 moles) 1,4,5,8-naphthalenetetracarbonyl-bis(11-undecanoic acid)imide and 170.3 g (1.00 moles) 5-amino-1,3,3-trimethylcyclohexanemethylamine is combined and subjected to substantially the same polycondensation profile and procedure employed for Polymer L. The resulting Polymer N exhibits solubility in dichloromethane-methanol, a crystalline melting point of 172° C. and a weight average molecular weight of 105,000.

Polymer O

Poly[1,3,3-trimethylcyclohexane-1,5-methylene dodecamethylene-co-1,4,5,8naphthalenetetracarbonyl-bis(imido-11-undecamethylene)(90/10)]amide A mixture of 200.3 g (1.00 moles) 1,3,3-trimethylcyclohexanemethyldiammonium dodecandioate and 304.2 g (1.00 moles) 1,3,3-trimethylcyclohexanemethyldiammonium 1,4,5,8-naphthalenetetracarbonyl-bisimido-3-propionate is combined and subjected to substantially the same polycondensation profile and procedure employed for Polymer L. The resulting Polymer O exhibits solubility in a mixture of dichloromethane-methanol and has a glass transition temperature of 152° C. and a weight average molecular weight of 25,000.

Polymer P

Poly[1,3,3-trimethylcycylohexane-1,5-methylene 1, 4,5,8-naphthalenetetra-carbonyl-bis(imido-11-undecamethylene)amide-co-dodecamethylene(60/40)]amide A mixture of 80.1 g (0.20 moles) 1,3,3-trimethylcyclohexanemethyldiammonium dodecanedioate, 253.5 g (0.40 moles), and 68.1 g (0.40 moles) 5-amino-1,3,3-trimethylcyclohexanemethyamine is combined and subjected to substantially the same polycondensation profile and procedure employed for Polymer L. The resulting Polymer P exhibits solubility in a mixture of dichlorormethane-methanol, has a glass transition temperature of 113° C. and a weight average molecular weight of 141,000.

Polymer Q

Poly[decamethylene-co-piperazino (70/30) decamethylene-co-1,1,3-trimethyl-3(4-phenylindanyl-co-1,4,5,8-naphthalenetetracarbonyl-bisimidopropylene (50/30/20)]amide.

A mixture of 115.15 g (0.50 moles) of docecanedioic acid, 96.2 g (0.30 moles) of 1,1,3-trimethyl-3-(4-carboxyphenyl)-5-indancarboxylic acid, 87.6 g (0.20 moles) of 1,4,5,8-napthalenetetracarbonyl-bis(3-carboxypropyl)imide, 47.6 g (0.70 moles) of 1,4-piperazine, and 69.1 g (0.30 moles) of dodecane diamine is combined in a polymerization flask equipped with side arm and gas inlet tube, and heated to 200° C. to achieve a homogenous, optically transparent, dark burgundy-colored melt. The temperature is raised from 220° C. to 280° C. and maintained until no further distillate is detected. The flask is then equipped with a stirrer, fitted to a vacuum source, and polymerized to moderate-high melt viscosity. The resulting Polymer Q has a glass transition temperature of 90° C. and a weight average molecular weight of 81,000.

Polymer LOU1

Poly[piperazine-co1,3,3-trimethylcyclohexane-1,5-methylene (20/80) decamethylene-co-1,4,5,8-naphthalenetetracarbonyl-bis(imido-11-undecamethylene)-co-octamethylene (20/50/30)] amide A mixture of 31.6 g (0.1 moles) of piperazonium dodecanedioate, 55.9 g (0.15 moles) of 1,3,3-trimethylcyclohexanemethylenediammonium sebacate, 42.6 g (0.25 moles) of 1,3,3-trimethylcyclohexanemethylenediamine, 158.5 g (0.25 moles) of 1,4,5,8-naphthalenetetracarbonyl-bis(11-undecanoic acid)imide is combined and subjected to substantially the same polycondensation profile and procedure employed for Polymer L. The resulting Polymer LOU1 is soluble in mixed solvents such as dichloromethane-methanol, has a glass transition temperature of 112° C., and a weight average molecular weight of 130,000.

Polymer LOU2

Poly[piperazine-co 1,3,3-trimethylcyclohexane-1,5-methylene (20/80) decamethylene-co-1,4,5,8-naphthalenetetracarbonyl-bis(imido-11-undecamethylene)-co-octamethylene (20/75/5)] amide A mixture of 6.33 g (0.02 moles) of piperazonium dodecanedioate, 1.86 g (0.005 moles) of 1,3,3-trimethylcyclohexanemethylenediammonium sebacate, 12.77 g(0.075 moles) of 1,3,3-trimethylcyclohexanemethylenediamine, 47.55 g (0.075 moles) of 1,4,5,8-naphthalenetetracarbonyl-bis(11-undecanoic acid)imide is combined and subjected to substantially the same polycondensation profile and procedure employed for Polymer L. The resulting Polymer LOU2 is soluble in mixed solvents such as dichloromethane-methanol, has a glass transition temperature of 115° C. and a melting temperature of 166° C., and a weight average molecular weight of 109,000.

Polymer LOU3

Poly[piperazine-co 1,3,3-trimethylcyclohexane-1,5-methylene (20/80) decamethylene-co-1,4,5,8-naphthalenetetracarbonyl-bis(imido-11-undecamethylene)-co-octamethylene (25/70/5)] amide A mixture of 7.91 g (0.025 moles) of piperazonium dodecanedioate, 1.86 g (0.005 moles) of 1,3,3-trimethylcyclohexanemethylenediammonium sebacate, 11.92 g (0.07 moles) of 1,3,3-trimethylcyclohexanemethylenediamine, 44.38 g (0.07 moles) of 1,4,5,8-naphthalenetetracarbonyl-bis(11-undecanoic acid)imide is combined and subjected to substantially the same polycondensation profile and procedure employed for Polymer L. The resulting Polymer LOU3 is soluble in mixed solvents such as dichloromethane-methanol, has a glass transition temperature of 111° C. and a melting temperature of 152° C. that was not present on the second heat, and a weight average molecular weight of 174,000.

Example LOU1

A photoconductive element of the invention is prepared substantially as described in Comparative Example 1, except that the barrier layer polymer is Polymer LOU1. The barrier layer is prepared at 2.5 wt % in a 55/35/10 wt mixture of 1,1,2-trichloroethane/dichloromethane/ethanol and coated to give a 1.6 micron layer. The residual voltage after 10,000 cycles for the photoconductive elements obtained by Comparative Example 1 and Example LOU1 is evaluated according to the procedures previously described and shown in the Table LOU.

TABLE LOU

| Example | Barrier Polymer | Vtoe @ 20% RH Initial | Vtoe @ 20% RH 10,000 cycles | Delta |
|---|---|---|---|---|
| Comparative Example 1 | Amilan | −17 | −317 | 300 |
| Example LOU1 | Polymer LOU1 | −86 | −63 | 23 |

As indicated in the foregoing Table LOU, utilizing the compositions of Polymers LOU1, LOU2, and LOU3 shown above can allow for coating polyamide-co-imides barrier polymers in relatively thick layers, and also very desirable residual voltages when used in an electrophotographic process.

The above polymers LOU 1–3 demonstrate that high levels of the electron transport agent can be incorporated into soluble polymers using commercially available monomers. The three polymers have 50, 75, and 70 mole % transport agent. The increasing amount of transport agent allows for lower residual voltages and thicker barrier layers to be employed. This has advantages in reducing the number of blackspots or breakdown. Thicker barrier layers also allow for the use of less perfect substrates, as a rougher surface can be rendered smooth by the thicker barrier layer.

Polyamide-co-imide examples of the invention and comparative polymers are shown in Table III with their respective responses to changes in relative humidity.

In the novel polyamide-co-imide of the invention as depicted by formula in Table III, $Ar_1$ represents a tetravalent aromatic group of from about 6 to 20 carbon atoms, R and $R^1$ independently represent alkylene or alkylenoxy groups of from about 2 to 12 carbon atoms, x is a mole fraction from about 0.05 to 1, y is a mole fraction from about 0 to 0.95 and z is a mole fraction from 0 to about 0.95.

TABLE III

POLYAMIDES

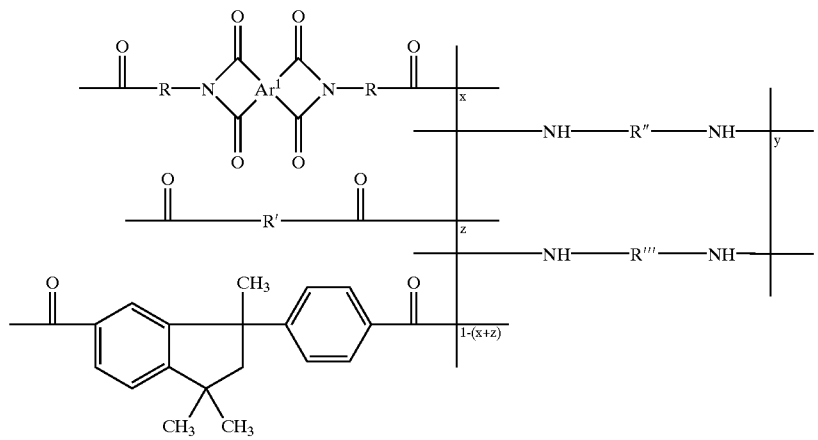

| Polymer | x | z | 1-(x + z) | y | 1-y | R | R' | R" | R''' | % Water Loss From 70F/60% RH to 80F/20% RH |
|---|---|---|---|---|---|---|---|---|---|---|
| Comparative Polymer J | | 0 | | | | | | | | 1.276 |

TABLE III-continued

POLYAMIDES

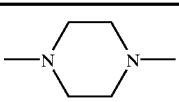

| Polymer | x | z | 1-(x + z) | y | 1-y | R | R' | R" | R''' | % Water Loss From 70F/60% RH to 80F/20% RH |
|---|---|---|---|---|---|---|---|---|---|---|
| Comparative Polymer K | 0 | 0.50 | 0.50 | 0.50 | 0.50 | | $-\!\!+\!\!CH_2\!\!+\!\!_{10}$ | 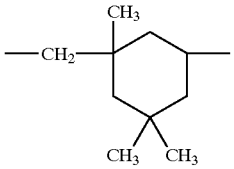 | $-\!\!+\!\!CH_2\!\!+\!\!_{12}$ | |
| L | 0.20 | 0.80 | | 1.00 | 0 | $-\!\!+\!\!CH_2\!\!+\!\!_{10}$ | $-\!\!+\!\!CH_2\!\!+\!\!_{10}$ | 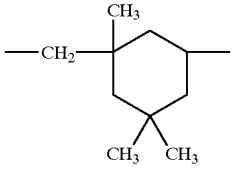 | | 0.172 |
| M | 0.10 | 0.90 | | 0.35 | 0.65 | $-\!\!+\!\!CH_2\!\!+\!\!_{3}$ | $-\!\!+\!\!CH_2\!\!+\!\!_{10}$ | 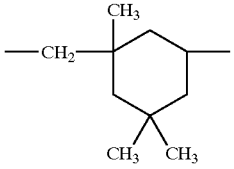 | | 0.207 |
| N | 1.00 | 0 | | 1.00 | 0 | $-\!\!+\!\!CH_2\!\!+\!\!_{10}$ | | 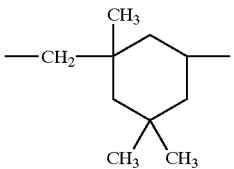 | | 0.236 |
| O | 0.10 | 0.90 | | 1.00 | 0 | $-\!\!+\!\!CH_2\!\!+\!\!_{10}$ | $-\!\!+\!\!CH_2\!\!+\!\!_{10}$ | 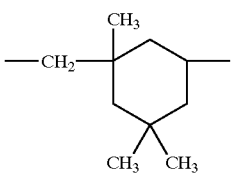 | | 0.244 |
| P | 0.40 | 0.60 | | 1.00 | 0 | $-\!\!+\!\!CH_2\!\!+\!\!_{10}$ | $-\!\!+\!\!CH_2\!\!+\!\!_{10}$ | | | 0.656 |

TABLE III-continued

POLYAMIDES

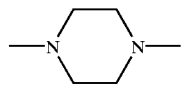

| Polymer | x | z | 1-(x + z) | y | 1-y | R | R' | R" | R''' | % Water Loss From 70F/60% RH to 80F/20% RH |
|---|---|---|---|---|---|---|---|---|---|---|
| Q | 0.20 | 0.50 | 0.30 | 0.70 | 0.30 | $-\text{\textlbrackdbl}CH_2\text{\textrbrackdbl}_3-$ | $-\text{\textlbrackdbl}CH_2\text{\textrbrackdbl}_{10}-$ | −N⟨⟩N− | $-\text{\textlbrackdbl}CH_2\text{\textrbrackdbl}_{12}-$ | |

Tables I, II and III show that the percent water loss for the polymers employed in the photoconductive elements of the invention is much smaller than the water loss for the control or comparative polymers which contain no planar, electron-deficient aromatic tetracarbonylbisimide group and which absorb and loose relatively large amounts of water with humidity changes. As a result, the comparative polymers are susceptible to substantial variation in conductivity when employed in a barrier layer.

The examples which follow describe the preparation and testing of photoconductive elements of the invention and of comparative photoconductive elements. They are referred to, respectively, as "examples" and as "comparative examples".

Comparative Example 1

A multiactive photoconductive film comprising a conductive support, a barrier layer, a charge generation layer (CGL), and a charge transport layer (CTL), coated in that order, is prepared from the following compositions and conditions.

Coated on nickelized poly (ethylene) terephthalate, at dry coverage of 0.05 g/ft² is a barrier layer of Amilan CM8000 polyamide having no planar tetracarbonylbisimide repeating unit. The barrier layer is prepared at 2.5 wt % in a 65/35 (wt/wt) mixture of ethanol and dichloromethane. A coating surfactant, SF1023, available from General Electric Company is added to the barrier layer coating solution at a concentration of 0.003 wt % of the total solution.

A second layer (CGL) is coated on the barrier layer at a dry coverage of 0.05 g/ft². The CGL mixture comprised 50% of a 75/25 co-crystalline pigment mixture of titanyl pthalocyanine and tetrafluoro titanyl phthalocyanine, prepared substantially as described in Molaire et al U.S. Pat. No. 5,614,342 and 50% of a polyester ionomer binder, poly[2, 2-dimethyl-1,3-propylene-co-oxydiethylene (80/20) isophthalate-co-5-sodiosulfoisophthalate (95/5)] prepared substantially as described in Molaire et al. U.S. Pat. No. 5,733,695. The CGL mixture is prepared at 3 wt % in a 65/35 (wt/wt) mixture of dichloromethane and 1,1,2-trichloroethane, as described in U.S. Pat. No. 5,614,342. A leveling agent, DC510 available from Dow-Corning Company of Midland, Mich. is added at a concentration of 0.019 wt % of the total solution.

A third layer (CTL) is coated onto the CGL at a dry coverage of 2.3 g/ft². The CTL mixture comprised 50-wt % Makrolon 5705, 10% poly[4,4'-(norbornylidene) bisphenol terephthalate-co-azelate (60/40)], 20 wt % of 1,1-bis[4-(di-4-tolylamino)phenyl] cyclohexane, and 20 wt % tri-(4-tolyl) amine. The CTL mixture is prepared at 10 wt % in dichloromethane. A coating surfactant, DC510, is added at a concentration of 0.016 wt % of the total mixture.

Comparative Example 2

A photoconductive element is prepared substantially as described in Comparative Example 1, except that the barrier layer polymer is AQ38S polyesterionomer, having no planar tetracarbonylbisimide moiety, sold by Eastman Chemical Company of Kingsport, Tenn. The barrier layer solution is prepared at 5 wt % deionized water. A coating surfactant, Olin 10G available from Olin Corporation, is added to the barrier layer coating solution at a concentration of 0.07 wt % of the total solution. The barrier layer is coated at a dry coverage of 0.05 g/ft².

EXAMPLE 1

A photoconductive element is prepared substantially as described in Comparative Example 1, except that the barrier layer polymer is Polymer E-1 of Table II. The barrier layer solution is prepared at 2 wt % in deionized water. A coating surfactant, Olin 10G, is added to the barrier layer coating solution at a concentration of 0.45 wt % of the total solution. The barrier layer is coated at a dry coverage of 0.05 g/ft².

EXAMPLE 2

A photoconductive element is prepared substantially as described in Comparative Example 1, except that the barrier layer polymer is Polymer I of Table II. The barrier layer solution is prepared at 2 wt % in deionized water. A coating surfactant, Olin 10G, is added to the barrier layer coating solution at a concentration of 0.45 wt % of the total solution. The barrier layer is coated at a dry coverage of 0.05 g/ft$^2$.

EXAMPLE 3

A photoconductive element is prepared substantially as described in Comparative Example 1, except that the barrier layer polymer is Polymer G of Table II. The barrier layer solution is prepared at 2 wt % in deionized water. A coating surfactant, Olin 10G, is added to the barrier layer coating solution at a concentration of 0.45 wt % of the total solution. The barrier layer is coated at a dry coverage of 0.05 g/ft$^2$.

EXAMPLE 4

A photoconductive element is prepared substantially as described in Comparative Example 1, except that the barrier layer polymer is Polymer F of Table II. The barrier layer solution is prepared at 2 wt % in deionized water. A coating surfactant, Olin 10G, is added to the barrier layer coating solution at a concentration of 0.45 wt % of the total solution. The barrier layer is coated at a dry coverage of 0.05 g/ft$^2$.

Although the described condensation polymers having aromatic tetracarbonyl-bisimide groups are valuable when used as the sole polymer of the barrier layer, as demonstrated by examples herein, the invention also includes barrier layers comprising a blend of such polymers with other polymers, such as for example, the Amilan CM8000 aliphatic copolyamide previously described herein. The following Examples 5, 6 and 7 describe such compositions. Their useful properties are illustrated by the results recorded in Table IV hereinafter.

EXAMPLE 5

A photoconductive element is prepared substantially as described in Comparative Example 1, except that the barrier layer is a 75/25 wt/wt mixture of Amilan CM8000 aliphatic polyamide and Polymer F of Table II. The barrier layer solution is prepared at 2 wt % in a methanol/water mixture. A coating surfactant, Olin 10G, is added to the barrier layer coating solution at a concentration of 0.45 wt % of the total solution. The barrier layer is coated at a dry coverage of 0.05 g/ft$^2$.

EXAMPLE 6

A photoconductive element is prepared substantially as described in Example 5, except that the barrier layer was a 75/25 wt/wt mixture of Amilan CM8000 aliphatic polyamide and Polymer E-1 of Table II.

EXAMPLE 7

The photoconductor is prepared substantially as described in Example 5, except that the barrier layer is a 50/50 wt/wt mixture of Amilan CM8000 aliphatic polyamide and Polymer E-1 of Table II.

Evaluation

The films are tested in a laboratory apparatus that charges, exposes and erases the film continuously. The residual or "toe" voltage after 2000 cycles is recorded for each film. The results shown in Table IV show that the photoconductive elements corresponding to examples of the invention outperform those of the comparative examples.

TABLE IV

| | | Absolute Residual Potential after 2,000 cycles | |
|---|---|---|---|
| Example | Barrier Polymer | 25° C. 50% RH | 25° C. 20% RH |
| Comp Ex. 1 | Amilan CM8000 | 46 V | 108 V |
| Comp Ex. 2 | AQ38S | 167 V | |
| Example 1 | Polymer E-1 | 47 V | 33 V |
| Example 2 | Polymer I | 44 V | 28 V |
| Example 3 | Polymer G | 50 V | 33 V |
| Example 4 | Polymer F | 43 V | 40 V |
| Example 5 | Amilan CM8000/Polymer F 75/25 (wt/wt) | 74 V | 80 V |
| Example 6 | Amilan CM8000/Polymer E-1 50/50 (wt/wt) | 62 V | 65 V |
| Example 7 | Amilan CM8000/Polymer E-1 75/25 (wt/wt) | 56 V | 66 V |

Evaluation of Regeneration Stability

Figure 2:
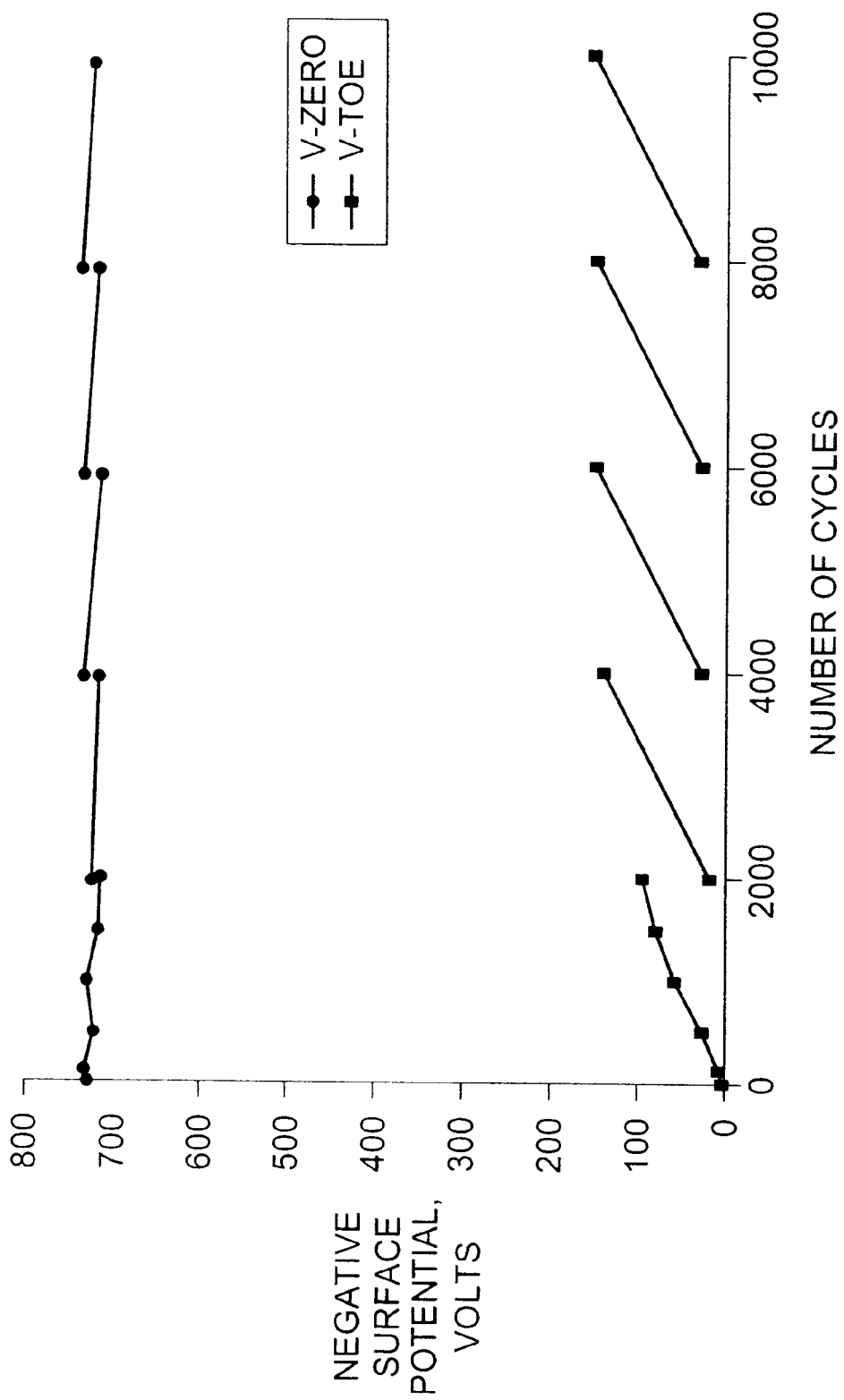
FIGS. 2–5 are graphical plots of results obtained in testing of examples of the invention and comparative examples as described hereinafter.
Figure 3:
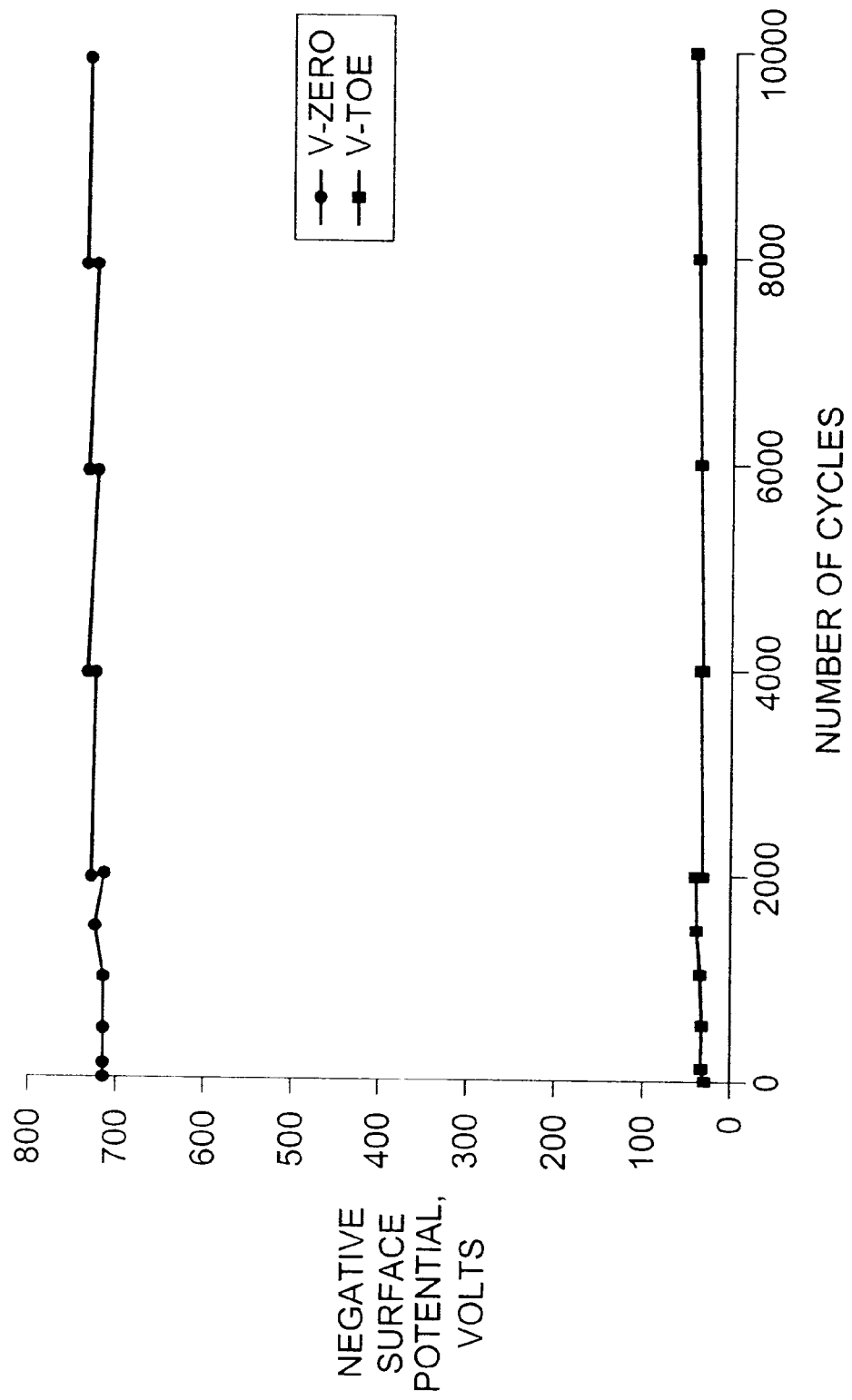
Figure 4:
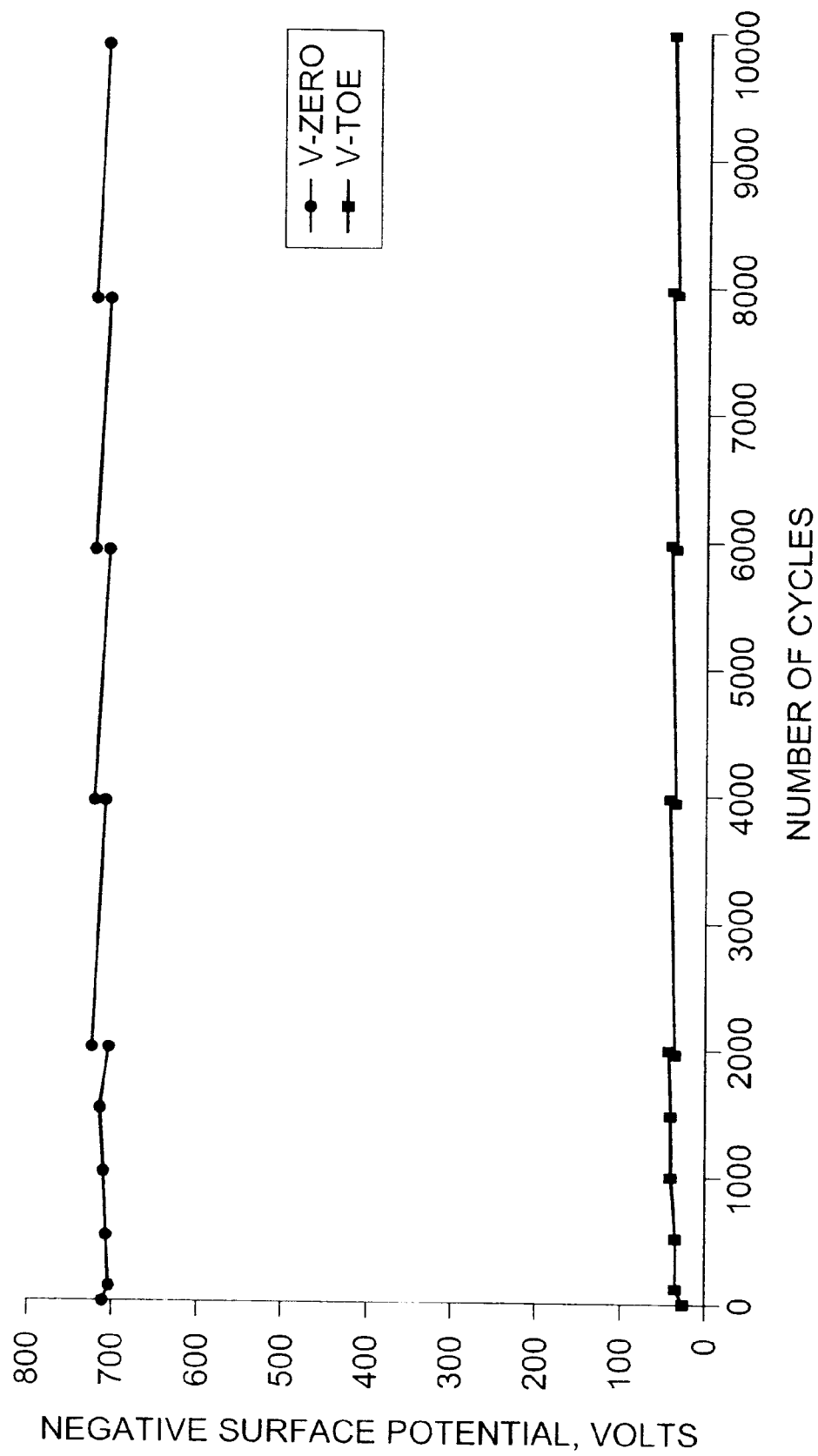
Figure 5:
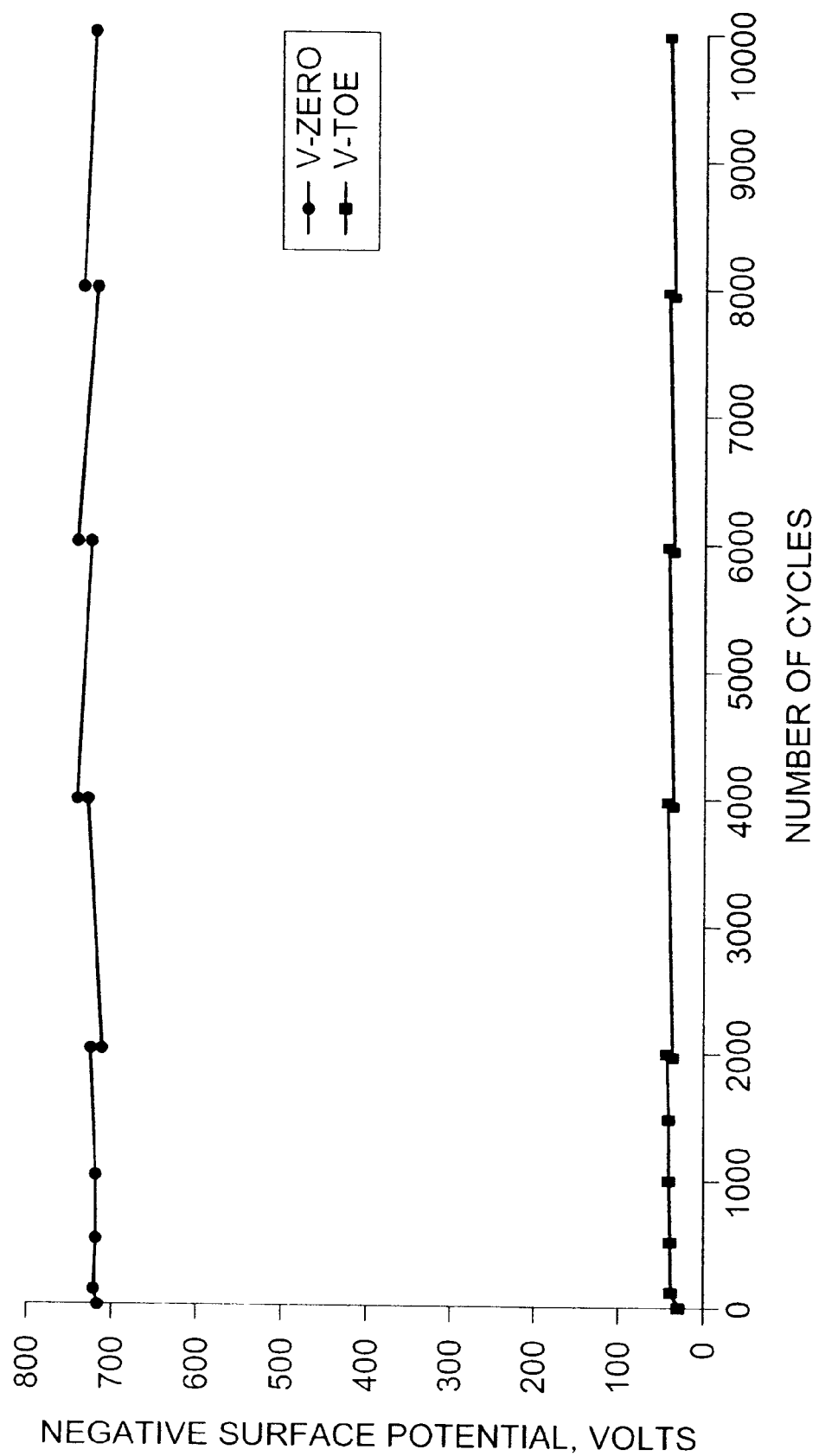

An electrophotographic or photoconductive element that is cycled many times in an electrophotographic process should maintain stable residual voltages close to zero during use. Longer regeneration cycles are run for Comparative Example 1, and Examples 1, 6 and 7. A device to measure regeneration sensitivity (regeneration sensitometer) which performs the analysis described in U.S. Pat. No. 5,874,018 (Column 22, lines 46–65) and U.S. Pat. No. 5,693,442 (Column 23, lines 32–50) the teachings of which are incorporated herein by reference, is stopped after every 2000 cycles for one hour and started again until 10,000 cycles are reached. The results are shown in FIGS. 2, 3, 4 and 5. These figures are plots of the negative surface potential, in volts, for the indicated photoconductive elements for Vo, i.e., the voltage after charging and before exposure and for the "toe voltage" which is the residual voltage on the photoconductive surface after full exposure. As shown in FIG. 2, for Comparative Example 1, the toe voltage rises substantially at 2000 cycles but drops back to the original value after the one-hour rest, only to climb back up again in the next 2000 cycle burst. FIGS. 3, 4 and 5 show that the photoconductive elements according to Examples 1, 6, and 7, respectively, are more stable with respect to toe voltage.

Evaluation of Electroformed Nickel Substrate

Comparative Example 3

A multiactive photoconductive element comprising an endless conductive nickel sleeve 180 mm diameter, 5 mil thick and 395 mm long, manufactured by Stork Rotaform, with a barrier layer, a charge generation layer (CGL), and a charge transport layer (CTL), coated in that order, thereon is prepared as follows:

Coated on the endless seamless nickel sleeve using the dip coating process, at dry coverage of 0.15 g/ft$^2$, is a barrier layer of Amilan CM8000 polyamide. The barrier layer is solution coated using 3.5 wt % in a 65/35 (wt/wt) mixture of ethanol and dichloromethane. A coating surfactant, SF1023, is added to the barrier layer coating solution at a concentration of 0.003 wt % of the total solution.

A second layer (CGL) is coated on the barrier layer at a dry coverage of 0.05 g/ft$^2$. The CGL mixture comprises 50% of a 90/10 co-crystalline pigment mixture of titanyl pthalocyanine and tetrafluoro titanyl phthalocyanine, prepared as described in Molaire et al. U.S. Pat. No. 5,614,342 and 50% of a polyester ionomer binder, poly [2,2-dimethyl-1,3-propylene-co-oxydiethylene (80/20) isophthalate-co-5-sodiosulfoisophthalate (95/5)] prepared as described in Molaire et al. U.S. Pat. No. 5,733,695. The CGL mixture is prepared at 3 wt% in a 65/35 (wt/wt) mixture of dichloromethane and 1,1,2-trichloroethane, as described in U.S. Pat. No. 5,614,342. A leveling agent, DC510, is added at a concentration of 0.019 wt % of the total solution.

A third layer (CTL) is coated onto the CGL at a dry coverage of 2.3 g/ft$^2$. The CTL mixture comprises 30 wt % Makrolon 5705 polymer available from Mobay Company, 20 wt % Lexan polymer available from General Electric Company, 10 wt % poly[4,4'-norbornylidene-bisphenol terephthalate-co-azelate (60/40)], 20 wt % of 1,1-bis [4-(di-4-tolylamino)phenyl] cyclohexane, and 20 wt % tri-(4-tolyl) amine. The CTL mixture is prepared at 10 wt % in dichloromethane. A coating surfactant, DC510, is added at a concentration of 0.016 wt % of the total mixture.

EXAMPLE 8

A photoconductive element is prepared substantially as described in Comparative Example 3, except that the barrier layer is Polymer G of Table II. The barrier layer solution is prepared at 3.5 wt% in a 65/35 (wt/wt) mixture of ethanol and deionized water. A coating surfactant, Olin 10G, is added to the barrier layer coating solution at a concentration of 0.45 wt % of the total solution. The barrier layer is coated at a dry coverage of 0.12 g/ft$^2$. The CGL is coated out of 100% tetrahydrofuran as a solvent.

The photoconductive elements prepared in Comparative Example 3 and Example 8 are evaluated in an electrophotographic printer. The residual, or toe voltage, for each cylinder is measured initially and after 1000 cycles. The results are shown in Table V. The barrier layer of Example 8 shows markedly more stable performance at 25% RH as compared to Comparative Example 3.

TABLE V

| Example | Barrier Polymer | Vexposed @ 25% RH Initial | Vexpose @ 25% RH 1000 cycles | Delta |
|---|---|---|---|---|
| Comp. Example 3 | Amilan CM8000 on Nickel sleeve | 160 V | 238 V | +78 V |
| Example 8 | Polymer G on Nickel sleeve | 181.6 V | 185.6 V | +4 V |

The following Comparative Example 4 and Examples 9, 10, 11 and 12 demonstrate the effect of barrier layer thickness on regeneration of photoconductive films.

Comparative Example 4

A photoconductive element is prepared substantially as described in Comparative Example 1, except that the charge generation layer is coated at a dry coverage of 0.1 g/ft$^2$.

EXAMPLE 9

A photoconductive element is prepared substantially as described in Comparative Example 4, except that the barrier layer polymer is Polymer E-2 of Table II. The barrier layer solution is prepared at 2 wt % in deionized water. A coating surfactant, Olin 10G, is added to the barrier layer coating solution at a concentration of 0.45 wt % of the total solution. The barrier layer is coated at a dry coverage of 0.1 g/ft$^2$.

EXAMPLE 10

A photoconductive element is prepared substantially as described in Example 9, except that the barrier layer is coated at a dry coverage of 0.2 g/ft$^2$.

EXAMPLE 11

A photoconductive element is prepared substantially as described in Comparative Example 4, except that the barrier layer polymer is Polymer E-3 of Table II. The barrier layer solution is prepared at 2 wt % in deionized water. A coating surfactant, Olin 10G, is added to the barrier layer coating solution at a concentration of 0.45 wt % of the total solution. The barrier layer is coated at a dry coverage of 0.5 g/ft$^2$.

EXAMPLE 12

A photoconductive element is prepared substantially as described in Example 11, except that the barrier layer is coated at a dry coverage of 0.2 g/ft$^2$.

Evaluation

The photoconductor films are tested in an apparatus that charges, exposes and erases the film continuously. The residual, or toe, voltage after 1000 cycles (toe@20% RH) is recorded for each film. The results show that Examples 9–12, even with substantially thicker barrier layers, outperform Comparative Example 4 by exhibiting lower differences between the initial toe voltage (in volts) and the voltage after 1000 cycles, as recorded in the "Delta" column of Table VI.

TABLE VI

| Example | Barrier Polymer | Thickness g/ft$^2$ | Vtoe @ 25° C./ 20% RH Initial | Vtoe @ 25° C./ 20% RH 1000 cycles | Delta |
|---|---|---|---|---|---|
| Comparative Example 4 | CM8000 Amilan | 0.05 | −9 | −75 | 66 |
| Example 9 | Polymer E-2 | 0.05 | −11 | −21 | 10 |
| Example 10 | Polymer E-2 | 0.2 | −50 | −78 | 28 |
| Example 11 | Polymer E-3 | 0.05 | −13 | −19 | 6 |
| Example 12 | Polymer E-3 | 0.2 | −31 | −38 | 7 |

Comparative Example 4A

A photoconductive element is prepared substantially as described in Comparative Example 1, except that the barrier layer polymer is Amilan CM8000 polyamide. The barrier layer is prepared at 2.5 wt % in a 65/35 (wt/wt) mixture of ethanol and dichloromethane. A coating surfactant, SF1023, is added to the barrier layer coating solution at a concentration of 0.003 wt % of the total solution. The barrier layer is coated at a dry coverage of 0.1 g/ft$^2$.

Comparative Example 5

A photoconductive element is prepared substantially as described in Comparative Example 1, except that the barrier layer polymer is Comparative Polymer K of Table III. The barrier layer is prepared at 2.5 wt % in a 65/35 (wt/wt) mixture of ethanol and dichloromethane. A coating surfactant, SF1023, is added to the barrier layer coating solution at a concentration of 0.003 wt % of the total solution. The barrier layer is coated at a dry coverage of 0.1 g/ft$^2$.

EXAMPLE 13

A photoconductive element of the invention is prepared substantially as described in Comparative Example 1, except that the barrier layer polymer is Polymer Q of Table III. The barrier layer is prepared at 2.5 wt % in a 65/35 (wt/wt) mixture of ethanol and dichloromethane. A coating surfactant, SF1023, is added to the barrier layer coating solution at a concentration of 0.003 wt % of the total solution. The barrier layer is coated at a dry coverage of 0.1 $g/ft^2$.

The residual voltage after 1000 cycles for the photoconductive elements obtained by Comparative Example 4A, Comparative Example 5, and Example 13 is also evaluated according to the procedures previously described and are shown in Table VII.

TABLE VII

| Example | Barrier Polymer | Vtoe @ 20% RH Initial | Vtoe @ 20% RH 1000 cycles | Delta |
|---|---|---|---|---|
| Comp. Example 4A | CM8000 Amilan | −22 V | −110 V | +88 V |
| Comp. Example 5 | Polymer K | −153 V | −243 V | +90 V |
| Example 13 | Polymer Q | −41 V | −60 V | +19 V |

Black Spots Evaluation

As disclosed in Bugner et al U.S. Pat. No. 5,681,677, incorporated herein by reference, in a Discharged Area Development (DAD) system, such as a high speed laser or LED printer, black spot formation can occur with certain photoconductive elements. The choice of barrier layer its thickness is critical to minimize and eliminate the formation of black spots. The following examples demonstrate the good performance of photoconductive elements of the invention, and are coated using a 30 mm drum format compatible with the Hewlett Packard LaserJet 5Si commercial laser printer.

Comparative Example 6

The methods and compositions of Comparative Example 3 are employed to coat a 30 mm aluminum drum, compatible with the HP LaserJet 5Si laser printer, with a photoconductive composition, except that no barrier layer is used. The CGL layer is coated over the bare aluminum substrate.

Comparative Examples 7 A–D

The procedures of Comparative Example 6 are substantially repeated for Comparative Examples 7A–D, except that Amilan CM8000 polymer is used as a barrier layer and coated at 0.1, 0.3, 0.8, and 1.7 microns respectively.

EXAMPLES 14 A–C

A photoconductive element of the invention is prepared substantially as per the procedures of Comparative Examples 7A–D, except that Polymer L of Table III is used as the barrier layer.

EXAMPLES 15A–C

A photoconductive element of the invention is prepared substantially as per the procedures of Comparative Examples 7A–D, except that Polymer E-2 of Table II is used as the barrier layer.

To evaluate "black spots" formation susceptibility of these drums, the drum being evaluated is used to replace the original drum of an HP5Si cartridge. A "white page" is generated using the LaserJet 5Si laser printer for each drum sample. The generated white pages are scanned and analyzed for black spots by known methods. Correction is made for single toner background particles. The area analyzed is kept constant for all samples. The lower the "black spot count" shown in Table VIII, the better is the barrier layer. The results are shown in Table VIII. The effect of barrier thickness can be seen. Without any barrier, black spot count is above 15,000. It is down to 241 for a 0.8-micron Amilan CM8000. Examples 14 A–C and 15 A–C show good performance for similar barrier layer thicknesses.

TABLE VIII

| Example | Barrier Polymer | Thickness Microns | Black Spot Count |
|---|---|---|---|
| Comp Example 6 | None | None | 15,667 |
| Comp Example 7A | Amilan CM8000 | 0.1 | 5,587 |
| Comp Example 7B | Amilan CM8000 | 0.3 | 449 |
| Comp Example 7C | Amilan CM8000 | 0.8 | 241 |
| Comp Example 7D | Amilan CM8000 | 1.7 | 265 |
| Example 14A | Polymer L | 0.2 | 662 |
| Example 14B | Polymer L | 0.8 | 333 |
| Example 14C | Polymer L | 1.2 | 294 |
| Example 15A | Polymer E-2 | 0.8 | 580 |
| Example 15B | Polymer E-2 | 01.1 | 161 |
| Example 15C | Polymer E-2 | 1.6 | 130 |

Effect of CGL Coating Solvent

EXAMPLES 16–17

For the barrier layer to be effective, it is essential that it keep its integrity after the next coating (CGL) is applied. In other words, the solvent of the CGL coating should not attack and dissolve the coated barrier layer. This is even more critical in a dip coating process, because of relatively long residence time in the coating solution. To show the importance of this effect, Examples 16 and 17 are coated using Polymer H and Polymer E-1 respectively. These polyesterionomer-co-imides are slightly soluble and/or swellable by chlorinated solvents such as dichloromethane (DCM) and 1,1,2-trichloroethane (TCE). However, they are immune to attack by tetrahydrofuran (THF). These two barrier polymers are coated respectively with a DCM/TCE and THF CGL solution in a process similar to that described in Comparative Example 3. The black spot count comparison, as previously described, for the two conditions is shown in Table IX. The THF CGL versions performed substantially better than the DCM/TCE version. This demonstrates the importance of protecting the barrier layer from damage by the solvent used for the CGL.

TABLE IX

| Example | Barrier Polymer | Thickness Microns | Black Spot Count DCM CGL | Black Spot Count THF CGL |
|---|---|---|---|---|
| Example 16 | Polymer H | 0.7 | 1743 | 430 |
| Example 17 | Polymer E-1 | 2.5 | 1205 | 374 |

Further Examples of Polyesterionomer-Co-Imide Barrier Layers

The polyesterionomer-co-imide polymers described below are also prepared by well known melt-phase polycondensation techniques as documented by Sorenson W. R. and Campbell T. W., "Preparative Methods of Polymer Chemistry", pp. 113–116, Interscience Publishing Inc. (1961), New York, N.Y.

Comparative Polymer AA

Poly [2,2'-oxydiethylene-co-1,4-cyclohexamethylene (54/46) 5-sodiosulfoisophthalate-co-isophthalate (18/82)] is commercially available as AQ55S polymer from Eastman Chemical Company, of Kingsport, Tenn. This material is tested as received and is also prepared as follows:

A mixture of 159 grams (g) (0.82 moles) of dimethylisophthalate, 53.28 g (0.18 moles) of dimethyl-5-sodiosulfoisophthalate, 44.6 g (0.31 moles) cyclohexane-dimethanol and 86.2 g (0.78 moles) of 2,2'-oxydiethanol contained in a polymerization flask equipped with a Claisen head and a nitrogen inlet tube is heated to 200° C. under a nitrogen atmosphere to produce a clear, homogenous melt. Then 100 ppm of titanium isopropoxide catalyst is added to the flask, and the temperature is slowly raised to 260° C. over several hours. Heating is continued until no further evolution of methanol can be detected. A mechanical stirrer is then introduced, and the flask connected to a source of vacuum. The mixture is stirred under vacuum at 260° C. for about two hours, and then cooled to room temperature. The resulting Comparative Polymer AA is then removed from the flask and submitted for analysis. Comparative Polymer AA has an inherent viscosity of 0.48 dl/g, a glass transition temperature of 55° C., and a weight average molecular weight of 48,000.

Comparative Polymer BB

Poly [2,2'-oxydiethylene-co4,4'-isopropylidenebisphenoxyethylene (75/25) isophthalate-co-5-sodiosulfoisophthaltate (50/50)]

A mixture of 97 g (0.50 moles) of dimethylisophthalate, 148 g (0.50 moles) of dimethyl-5-sodiosulfoisophthalate, 79 g (0.25 moles) of 4,4'isopropylidenebisphenoxydiethanol, and 111.3 g (1.05 moles) of 2,2'-oxydiethanol is charged to a polymerization flask equipped with a Claisen head and a nitrogen inlet tube and heated to 200° C. under a nitrogen atmosphere to produce a transparent, homogeneous melt. Polycondensation is conducted substantially as described for Comparative Polymer AA. The resulting Comparative Polymer BB has a glass transition temperature of 61° C., and a weight average molecular weight of 26,000.

Polymer CC

Poly[2,2'-dimethyl-1,3-propylene-co-1,4,5,8-naphthalenetetracarbonyl-bisimido-5-pentamethylene (75/25) isophthalate-co-5-sodiosulfoisophthaltate (50/50)]

A mixture of 97.10 g (0.50 moles) of dimethylisophthalate, 148.12 g (0.50 moles) of dimethyl-5-sodiosulfoisophthalate, 109.62 g (0.25 moles) of 1,4,5,8-naphthalene-tetracarbonyl-bis(5-hydroxypentyl)imide, and 130.19 g (1.25 moles) of 2,2'-dimethyl-1,3-propanediol is charged to a polymerization flask equipped with a Claisen head and a nitrogen inlet tube and heated to 200° C. under a nitrogen atmosphere to produce a transparent, burgundy-colored, homogenous melt. Polycondensation is conducted substantially as described for Comparative Polymer AA. The resulting Polymer CC has a glass transition of 121° C., and a weight average molecular weight of 8,000.

Comparative Polymer DD

This comparative polymer is a commercially available aliphatic polyamide sold under the trade name "Amalon CM-8000", and is manufactured by the Toray Co., Ltd. of Japan. This polymer is identified in U.S. Pat. No. 5,876,889, which is incorporated herein by reference in its entirety, as a copolymerized nylon having the composition 6/66/610/12. Identification of the monomers, which form the 6/66/610/12 copolymer are described above. The copolymer, as received from the manufacturer, has a weight average molecular weight of 60,000 and a crystalline melting point of 80° C.

Polymer EE

Poly[2,2'-oxydiethylene-co-1,4,5,8-naphthalenetetracarbonyl-bisimido-5-pentamethylene (75/25) isophthalate-co-5-sodiosulfoisophthaltate (50/50)]

A mixture of 97.10 g (0.50 moles) of dimethylisophthalate, 148.12 g (0.50 moles) of dimethyl-5-sodiosulfoisophthalate, 109.62 g (0.25 moles) of 1,4,5,8-naphthalenetetra-carbonyl-bis(5-hydroxypentyl)imide, and 132.65 g (1.25 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is otherwise conducted substantially as described for Comparative Polymer AA. The resulting Polymer EE has a glass transition temperature of 98° C., and a weight average molecular weight of 17,000.

Polymer FF

Poly[2,2'-oxydiethylene-co-1,4,5,8-naphthalenetetracarbonyl-bisimido-5-pentamethylene (62.5/37.5) isophthalate-co-5-sodiosulfoisophthaltate (50/50)]

A mixture of 19.42 g (0.10 moles) of dimethylisophthalate, 29.62 g (0.10 moles) of dimethyl-5-sodiosulfoisophthalate, 32.89 g (0.075 moles) of 1,4,5,8-naphthalenetetra-carbonyl-bis(5-hydroxypentyl)imide, and 23.88 g (0.225 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer FF has a glass transition temperature of 114° C., and a weight average molecular weight of 21,000.

Polymer GG

Poly[2,2'-oxydiethylene-co-1,4,5,8-naphthalenetetracarbonyl-bisimido-5-pentamethylene (50/50) isophthalate-co-5-sodiosulfoisophthaltate (50/50)]

A mixture of 19.42 g (0.10 moles) of dimethylisophthalate, 29.62 g (0.10 moles) of dimethyl-5-sodiosulfoisophthalate, 43.85 g (0.10 moles) of 1,4,5,8-naphthalenetetra-carbonyl-bis(5-hydroxypentyl)imide, and 21.22 g (0.20 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer GG has a glass transition temperature of 120° C., and a weight average molecular weight of 20,000.

Polymer HH

Poly[2,2'-oxydiethylene-co-1,4,5,8-naphthalenetetracarbonyl-bisimido-5-pentamethylene (25/75) isophthalate-co-5-sodiosulfoisophthaltate (50/50)]

A mixture of 19.42 g (0.10 moles) of dimethylisophthalate, 29.62 g (0.10 moles) of dimethyl-5-sodiosulfoisophthalate, 65.77 g (0.15 moles) of 1,4,5,8-naphthalenetetra-carbonyl-bis(5-hydroxypentyl)imide, and 15.92 g (0.15 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer HH has a glass transition temperature of 124° C., and a weight average molecular weight of 14,500.

Polymer II

Poly[2,2'-oxydiethylene-co-1,4,5,8-naphthalenetetracarbonyl-bisimido-5-pentamethylene (75/25) trans-cyclohexanedicarboxylate-co-5-sodiosulfoisophthaltate (50/50)]

A mixture of 100.1 g (0.50 moles) of trans-1,4-dimethylcyclohexane dicarboxylate, 148.1 g (0.50 moles) of dimethyl-5-sodiosulfoisophthalate, 109.6 g (0.25 moles) of 1,4,5,8-naphthalenetetracarbonyl-bis(5-hydroxypentyl) imide, and 132.7 g (1.25 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer II has a glass transition temperature of 92° C., and a weight average molecular weight of 22,000.

Polymer JJ

Poly[2,2'-oxydiethylene-co-1,4,5,8-naphthalenetetracarbonyl-bisimido-5-pentamethylene (25/75) trans-cyclohexanedicarboxylate-co-5-sodiosulfoisophthaltate (50/50)]

A mixture of 20.02 g (0.10 moles) of trans-1,4-dimethylcyclohexane dicarboxylate, 29.62 g (0.10 moles) of dimethyl-5-sodiosulfoisophthalate, 65.77 g (0.15 moles) of 1,4,5,8-naphthalenetetracarbonyl-bis(5-hydroxypentyl) imide, and 15.92 g (0.15 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer JJ has a glass transition temperature of 128° C., and a weight average molecular weight of 14,000.

Polymer KK

Poly[2,2'-oxydiethylene-co-1,4,5,8-naphthalenetetracarbonyl-bisimido-5-pentamethylene (75/25) sebacate-co-5-sodiosulfoisophthaltate (50/50)]

A mixture of 23.03 g (0.10 moles) of dimethylsebacate, 29.62 g (0.10 moles) of dimethyl-5-sodiosulfoisophthalate, 21.92 g (0.05 moles) of 1,4,5,8-naphthalenetetra-carbonyl-bis(5-hydroxypentyl)imide, and 26.53 g (0.25 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer KK has a glass transition temperature of 134° C., and a weight average molecular weight of 53,000.

Polymer LL

Poly[2,2'-oxydiethylene-co-1,4,5,8-naphthalenetetracarbonyl-bisimido-5-pentamethylene (75/25) isophthalate-co-sebacate-co-5-sodiosulfoisophthaltate (30/25/45)]

A mixture of 58.3 g (0.30 moles) of dimethylisophthalate, 57.6 g (0.25 moles) of dimethylsebacate, 133 g (0.45 moles) of dimethyl-5-sodiosulfoisophthalate, 109.6 g (0.25 moles) of 1,4,5,8-naphthalenetetracarbonyl-bis(5-hydroxypentyl) imide, and 132.7 g (1.25 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer LL has a glass transition temperature of 69° C., and a weight average molecular weight of 26,000.

Polymer MM

Poly[2,2'-oxydiethylene-co-1,4,5,8-naphthalenetetracarbonyl-bisimido-5-pentamethylene (75/25) isophthalate-co-5-sodiosulfoisophthaltate (70/30)]

A mixture of 27.19 g (0.14 moles) of dimethylisophthalate, 17.77 g (0.06 moles) of dimethyl-5-sodiosulfoisophthalate, 21.92 g (0.05 moles) of 1,4,5,8-naphthalenetetra-carbonyl-bis(5-hydroxypentyl)imide and 26.53 g (0.25 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer MM has a glass transition temperature of 76° C., and a weight average molecular weight of 38,000.

Polymer NN

Poly[2,2'-oxydiethylene-co-1,4,5,8-naphthalenetetracarbonyl-bisimido-5-pentamethylene (50/50) isophthalate-co-5-sodiosulfoisophthaltate (70/30)]

A mixture of 27.19 g (0.14 moles) of dimethylisophthalate, 17.77 g (0.06 moles) of dimethyl-5-sodiosulfoisophthalate, 43.85 g (0.10 moles) of 1,4,5,8-naphthalenetetra-carbonyl-bis(5-hydroxypentyl)imide and 21.22 g (0.20 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer NN has a glass transition temperature of 93° C., and a weight average molecular weight of 32,500.

Polymer OO

Poly[2,2'-oxydiethylene-co-1,4,5,8-naphthalenetetracarbonyl-bisimido-5pentamethylene (25/75) isophthalate-co-sebacate-co-5-sodiosulfoisophthaltate (15/40/45)]

A mixture of 5.83 g (0.030 moles) of dimethylisophthalate, 18.42 g (0.080 moles) of dimethylsebacate, 26.66 g (0.090 moles) of dimethyl-5-sodiosulfoisophthalate, 65.77 g (0.15 moles) of 1,4,5,8-naphthalenetetracarbonyl-bis(5-hydroxypentyl)imide and 115.92 g (0.15 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer OO has a glass transition temperature of 70° C., and a weight average molecular weight of 39,200.

Polymer PP

Poly [2,2'-oxydiethylene-co-5,5'-oxybis (diethyleneoxy)-co-1,4,5,8-naphthalenetetracarbonyl-bisimido-5-pentamethylene (35/40/25) isophthalate-co-5-sodiosulfoisophthaltate (50/50)]

A mixture of 19.42 g (0.10 moles) of dimethylisophthalate, 29.62 g (0.10 moles) of dimethyl-5-sodiosulfoisophthalate, 21.92 g (0.05 moles) of 1,4,5,8-naphthalenetetracarbonyl-bis(5-hydroxypentyl)imide, 15.54 g (0.08 moles) of tetraethyleneglycol, and 18.04 g (0.17 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. Polycondensation is conducted substantially as described for Comparative Polymer AA. The resulting Polymer PP has a glass transition temperature of 82° C., and a weight average molecular weight of 24,700.

Polymer QQ

Poly[2,2'-oxydiethylene-co-5,5'-oxybis (diethyleneoxy)-co-1,4,5,8-naphthalenetetracarbonyl-bisimido-5-pentamethylene (45/5/50) trans-cyclohexanedicarboxylate-co-5-sodiosulfoisophthaltate (60/40)]

A mixture of 24.03 g (0.12 moles) of trans-dimethylcyclohexanedicarboxylate, 23.70 g (0.08 moles) of dimethyl-5-sodiosulfoisophthalate, 43.85 g (0.10 moles) of 1,4,5,8-naphthalenetetracarbonyl-bis(5-hydroxypentyl)imide, 1.94 g (0.01 moles) of tetraethyleneglycol, and 20.16 g (0.19 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. The trans-dimethylcyclohexane-dicarboxylate monomer is obtained from Eastman Chemical Company of Kingsport, Tenn. Polycondensation is conducted substantially as described for Comparative Polymer AA. The resulting Polymer QQ has a glass transition temperature of 104° C., and a weight average molecular weight of 32,200.

Polymer RR

Poly[2,2'-oxydiethylene-co-1,4,5,8-naphthalenetetracarbonyl-bisimido-5-pentamethylene (50/50) cyclohexanedicarboxylate-co-5-sodiosulfoisophthaltate (60/40)]

A mixture of 24.03 g (0.12 moles) of cis,trans-dimethylcyclohexanedicarboxylate, 23.70 g (0.08 moles) of dimethyl-5-sodiosulfoisophthalate, 43.85 g (0.10 moles) of 1,4,5,8-naphthalenetetracarbonyl-bis(5-hydroxypentyl)imide, and 21.22 g (0.20 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. The cis,trans-dimethylcyclohexanedicarboxylate monomer is obtained from Eastman Chemical Company of Kingsport, Tenn., and is a mixture of 70 mol % of the cis-isomer and 30 mol % of the trans-isomer. Polycondensation is conducted substantially as described for Comparative Polymer AA. The resulting Polymer RR has a glass transition temperature of 99° C., and a weight average molecular weight of 35,700.

Polymer SS

Poly[2,2'-oxydiethylene-co-5,5'-oxybis (diethyleneoxy)-co-1,4,5,8-naphthalenetetracarbonyl-bisimido-5-pentamethylene(48/2/50)cyclohexanedicarboxylate-co-5-sodiosulfoisophthaltate (60/40)]

A mixture of 24.03 g (0.12 moles) of cis,trans-dimethylcyclohexanedicarboxylate, 23.70 g (0.08 moles) of dimethyl-5-sodiosulfoisophthalate, 43.85 g (0.10 moles) of 1,4,5,8-naphthalenetetracarbonyl-bis(5-hydroxypentyl)imide, 0.78 g (0.004 moles) of tetraethyleneglycol, and 20.80 g (0.196 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. The cis,trans-dimethylcyclohexanedicarboxylate monomer is as described for Polymer RR. Polycondensation is conducted substantially as described for Comparative Polymer AA. The resulting Polymer SS has a glass transition temperature of 95° C.

Polymer TT

Poly[2,2'-oxydiethylene-co-1,4,5,8-naphthalenetetracarbonyl-bisimido-5-pentamethylene (50/50) trans-cyclohexanedicarboxylate-co-5-sodiosulfoisophthaltate (60/40)]

A mixture of 24.03 g (0.12 moles) of trans-dimethylcyclohexanedicarboxylate, 23.70 g (0.08 moles) of dimethyl-5-sodiosulfoisophthalate, 43.85 g (0.10 moles) of 1,4,5,8-naphthalenetetracarbonyl-bis(5-hydroxypentyl)imide, and 21.22 g (0.20 moles) of 2,2'-oxydiethanol contained in a polymerization flask equipped with a Claisen head and a nitrogen inlet tube is heated to 200° C. under a nitrogen atmosphere to produce a transparent, burgundy, homogenous melt. The trans-dimethylcyclohexane-dicarboxylate monomer employed is as described for Polymer QQ. Polycondensation is conducted substantially as described for Comparative Polymer AA. The resulting Polymer TT has a glass transition temperature of 115° C., and a weight average molecular weight of 37,400.

Polymer UU

Poly[2,2'-oxydiethylene-co-1,4,5,8-naphthalenetetracarbonyl-bisimido-5-pentamethylene (50/50) trans-cyclohexanedicarboxylate-co-5-sodiosulfoisophthaltate (50/50)]

A mixture of 20.02 g (0.10 moles) of trans-dimethylcyclohexanedicarboxylate, 29.62 g (0.10 moles) of dimethyl-5-sodiosulfoisophthalate, 43.85 g (0.10 moles) of 1,4,5,8-naphthalenetetracarbonyl-bis(5-hydroxypentyl) imide, and 21.22 g (0.20 moles) of 2,2'-oxydiethanol contained in a polymerization flask equipped with a Claisen head and a nitrogen inlet tube is heated to 200° C. under a nitrogen atmosphere to produce a transparent, burgundy-colored, homogenous melt. The trans-dimethylcyclohexane-dicarboxylate monomer employed is as described for Polymer QQ. Polycondensation is conducted substantially as described for Comparative Polymer AA. The resulting Polymer UU has a glass transition temperature of 120° C., and a weight average molecular weight of 20,300.

Comparative Example 8

A multiactive photoconductive film, e.g. a photoconductive element, comprising a conductive support, a barrier layer, a charge generation layer (CGL), and a charge transport layer (CTL), coated in that order, is prepared from the following compositions by well known solution coating methods.

Solution coated on a nickelized poly(ethylene) terephthalate substrate, at dry coverage of 0.20 g/ft$^2$, is a barrier layer of Amalon CM-8000, Comparative Polymer DD, a commercially available polyamide having no planar tetracarbonyl-bisimide moiety, no ionomer content, and no ether linkage repeat units. The barrier layer is prepared using a coating solution containing 2.5 wt. % of Comparative Polymer DD dissolved in a 65/35 (wt./wt) mixture of ethanol and dichloromethane. A coating surfactant, SF1023, is added to the coating solution at a concentration of 0.003 wt. %, based on total solution weight. The barrier layer thickness is 1.6 microns.

A second layer (CGL) is solution coated on the barrier layer at a dry coverage of 0.05 g/ft$^2$. A CGL mixture employed is comprised of 50 wt % of a 75/25 co-crystalline pigment mixture of titanyl phthalocyanine and tetrafluoro titanyl phthalocyanine, prepared substantially as described in Molaire et al U.S. Pat. No. 5,614,342, the teachings of which are incorporated herein by reference in their entirety, and 50 wt % of a polyester ionomer binder, poly[2,2-dimethyl-1,3-propylene-co-oxydiethylene (80/20) isophthalate-co-5-sodiosulfoisophthalate (95/5)] prepared substantially as described in Molaire et al. U.S. Pat. No. 5,733,695, the teachings of which are also substantially incorporated herein by reference in their entirety. The CGL mixture is used to prepare a coating solution containing 3 wt. % of the CGL mixture in a 65/35 (wt./wt.) mixture of dichloromethane and 1,1,2-trichloroethane, substantially as described in U.S. Pat. No. 5,614,342. A leveling agent (surfactant), DC510, is added to the CGL coating solution at a concentration of 0.019 wt. % based on total solution weight.

A third layer (CTL) is solution coated onto the CGL layer at a dry coverage of 2.3 g/ft$^2$. A CTL mixture employed is comprised of 50 wt. % "Makrolon 5705" available from Mobay Company, 10 wt. % poly[4,4'-(norbornylidene) bisphenol terephthalate-co-azelate (60/40)], 20 wt. % of 1,1-bis[4-(di4-tolylamino)phenyl]cyclohexane, and 20 wt. % tri-(4-tolyl)amine. A CTL solution is prepared using 10 wt. % of the above CTL mixture dissolved in dichloromethane. A coating surfactant, DC510 as mentioned above, is added to the coating solution at a concentration of 0.016 wt. of the total solution weight.

Comparative Example 9

A photoconductive element is prepared substantially as described in Comparative Example 8, except that the barrier layer polymer is coated at a dry coverage of 0.4 g/ft$^2$. The barrier layer measures a thickness of 3.2 microns.

Comparative Example 10

A photoconductive element is prepared substantially as described in Comparative Example 8, except that the barrier layer polymer is coated at a dry coverage of 0.6 g/ft$^2$. The barrier layer measures a thickness of 5.2 microns.

Comparative Example 11

A photoconductive element is prepared substantially as described in Comparative Example 8, except that the barrier layer polymer is coated at a dry coverage of 0.8 g/ft$^2$. The barrier layer measures a thickness of 7.2 microns.

Comparative Example 12

A photoconductive element is prepared substantially as described in Comparative Example 8, except as described otherwise hereinafter. The barrier layer polymer employed is AQ55S polyester, Comparative Polymer AA, having no planar tetracarbonylbisimide moiety, and sold by Eastman Chemical Company of Kingsport, Tenn. The barrier layer solution is prepared using 5 wt. % of Comparative Polymer AA dissolved in deionized water. A coating surfactant, Olin 10G, is added to the coating solution at a concentration of 0.07 wt. %, based on total solution weight. The barrier layer is coated at a dry coverage of 0.05 g/ft$^2$.

Comparative Example 13

A photoconductive element is prepared substantially as described in Comparative Example 8, except as described otherwise hereinafter. The barrier layer polymer employed is a mixture of 75 wt. % Comparative Polymer DD and 25 wt % Comparative Polymer AA. The barrier layer solution is coated at 0.20 g/ft$^2$ from a 80/10/10 (wt/wt/wt) solution of methanol-water-isopropanol, respectively. The barrier layer measures a thickness of 1.5 microns.

Comparative Example 14

A photoconductive element is prepared substantially as described in Comparative Example 8, except as described otherwise hereinafter. The barrier layer polymer is a mixture of 85 wt % Comparative Polymer DD and 15 wt % Comparative Polymer AA. The barrier layer solution is coated at 0.20 g/ft$^2$ from a 80/10/10 (wt/wt/wt) solution of methanol-water-isopropanol, respectively. The barrier layer measures a thickness of 2.5 microns.

Comparative Example 15

A photoconductive element is prepared substantially as described in Comparative Example 8, except as described otherwise hereinafter. The barrier layer polymer is a mixture of 95 wt % Comparative Polymer DD and 5 wt % Comparative Polymer AA. The barrier layer is solution coated at 0.20 g/ft$^2$ from a 80/10/10 (wt/wt/wt) solution of methanol-water-isopropanol respectively. The barrier layer measures a thickness of 2.0 microns Comparative Example 16

A photoconductive element is prepared substantially as described in Comparative Example 8, except as described otherwise hereinafter. The barrier layer polymer is Comparative Polymer BB, a polyester ionomer having ether linkage repeat units, but no planar tetracarbonylbisimide moiety content. The barrier layer is solution coated at a dry coverage of 0.60 g/ft² using a solvent mixture of 75% by volume water to 25% by volume methanol. The barrier layer measures a thickness of 4.4 microns.

EXAMPLE 18

A photoconductive element is prepared substantially as described in Comparative Example 8, except as described otherwise hereinafter. The barrier layer polymer is Polymer CC, a polyester ionomer having planar tetracarbonylbisimide moiety content, but no ether linkage repeat units. The barrier layer solution is coated at a dry coverage of 0.60 g/ft² using a solvent mixture of 95% by volume water to 5% by volume isopropyl alcohol. The barrier layer measures a thickness of 4.4 microns.

Comparative Examples 17 A–C

A photoconductive element is prepared substantially as described in Comparative Example 8, except that the barrier layer solution is coated at a dry coverage of 0.075 g/ft². The performance of the element at RH levels of 13%, 10%, and 7% respectively, is described hereinafter in connection with Tables XI, XII, and XIII.

EXAMPLE 19

A photoconductive element is prepared substantially as described in Comparative Example 8, except as described otherwise hereinafter. The barrier layer polymer is Polymer CC, a polyester ionomer having planar tetracarbonylbisimide moiety content but without an ether linkage repeat unit segment. The barrier layer solution is solution coated at a dry coverage of 0.6 g/ft² using a solvent mixture of 80% by volume water to 20% by volume ethanol. The Olin 10G surfactant is employed in the barrier layer coating solution at a concentration of 0.015 wt. % based on total weight of the solution. A charge generation layer (CGL) is coated on the barrier layer at a dry coverage of 0.075 g/ft². The barrier layer measures a thickness of 4.8 microns.

EXAMPLE 20

A photoconductive element is prepared substantially as described in Comparative Example 8, except as described hereinafter. The barrier layer polymer is Polymer EE, a polyester ionomer having planar tetracarbonylbismide moiety content. The barrier layer is solution coated at a dry coverage of 0.40 g/ft² using a solvent mixture of 75% by volume water to 25% by volume methanol. The barrier layer measures a thickness of 3.4 microns.

EXAMPLE 21

A photoconductive element is prepared substantially as described in Comparative Example 1, except as described otherwise hereinafter. The barrier layer polymer is Polymer F, a polyester ionomer having planar tetracarbonylbisimide moiety content. The barrier layer is solution coated at a dry coverage of 0.40 g/ft² using a solvent mixture of 85% by volume water to 15% by volume ethanol. The barrier layer measures a thickness of 3.2 microns.

EXAMPLE 22

A photoconductive element is prepared substantially as described in Comparative Example 8, except as described otherwise hereinafter. The barrier polymer is Polymer GG, a polyester ionomer having planar tetracarbonylbisimide moiety content. The barrier layer is solution coated at a dry coverage of 0.60 g/ft² using a solvent mixture of 90% by volume water to 10% by volume ethanol. The barrier layer measures a thickness of 4.0 microns.

EXAMPLE 23

A photoconductive element is prepared substantially as described in Comparative Example 8, except as described otherwise hereinafter. The barrier layer polymer is Polymer HH, a polyester ionomer having planar tetracarbonylbisimide moiety content. The barrier layer is solution coated at a dry coverage of 0.40 g/ft² using a solvent mixture of 95% by volume water to 5% by volume isopropanol. The barrier layer measures a thickness of 2.5 microns.

EXAMPLE 24

A photoconductive element is prepared substantially as described in Comparative Example 8, except as described otherwise hereinafter. The barrier layer polymer is Polymer LL, a polyester ionomer having planar tetracarbonylbisimide moiety content. The barrier layer is solution coated at a dry coverage of 0.20 g/ft² using a solvent mixture of 85% by volume water to 15% by volume methanol. Olin 10G surfactant is employed in the barrier layer coating solution at a concentration of 0.015 wt % based on total solution weight. The barrier layer measures a thickness of 2.0 microns.

EXAMPLE 25

A photoconductive element is prepared substantially as described in Comparative Example 8, except as described otherwise hereinafter. The barrier layer polymer is Polymer LL, a polyester ionomer having planar tetracarbonylbisimide moiety content. The barrier layer is solution coated at a dry coverage of 0.40 g/ft² using a solvent mixture of 85% by volume water to 15% by volume methanol. Olin 10G surfactant is employed in the barrier layer coating solution at a concentration of 0.015 wt. % based on total solution weight. The barrier layer measures a thickness of 3.2 microns.

EXAMPLE 26

A photoconductive element is prepared substantially as described in Comparative Example 8, except as described otherwise hereinafter. The barrier layer polymer is Polymer LL, a polyester ionomer having planar tetracarbonylbisimide moiety content. The barrier layer is solution coated at a dry coverage of 0.60 g/ft² using a solvent mixture of 85% by volume water to 15% by volume methanol. Olin 10G surfactant is employed in the barrier layer coating solution at a concentration of 0.015 wt. % based on total solution weight. The barrier layer measures a thickness of 4.2 microns.

EXAMPLE 27

A photoconductive element is prepared substantially as described in Comparative Example 8, except as described otherwise hereinafter. The barrier layer polymer is Polymer II, a polyester ionomer having planar tetracarbonylbisimide moiety content. The barrier layer is solution coated at a dry coverage of 0.20 g/ft² using a solvent mixture of 80% by volume water to 20% by volume methanol. The barrier layer measures a thickness of 1.2 microns.

EXAMPLE 28

A photoconductive element is prepared substantially as described in Comparative Example 8, except as described otherwise hereinafter. The barrier layer polymer is Polymer JJ, a polyester ionomer having planar tetracarbonylbisimide moiety content. The barrier layer is solution coated at a dry coverage of 0.40 g/ft$^2$ using a solvent mixture of 95% by volume water to 5% by volume methanol. The barrier layer measures a thickness of 2.5 microns.

EXAMPLES 29 A–C

A photoconductive element is prepared substantially as described in Example 24. The barrier layer measures a thickness of 1.8 microns. The performance of the element at RH levels of 13%, 10%, and 7% respectively, is described hereinafter in connection with Tables XI, XII, and XIII.

EXAMPLES 30 A–C

A photoconductive element is prepared substantially as described in Example 25. The barrier layer measures a thickness of 3.4 microns. The performance of the element at RH levels of 13%, 10%, and 7% respectively, is described hereinafter in connection with Tables XI, XII, and XIII.

EXAMPLES 31 A–C

A photoconductive element is prepared substantially as described in Example 26. The barrier layer measures a thickness of 4.4 microns. The performance of the element at RH levels of 13%, 10%, and 7% respectively, is described hereinafter in connection with Tables XI, XII, and XIII.

EXAMPLES 32 A–C

A photoconductive element is prepared substantially as described in Comparative Example 8, except as described otherwise hereinafter. The barrier layer polymer is Polymer EE, a polyester ionomer having planar tetracarbonylbisimide moiety content. The barrier layer is solution coated at a dry coverage of 0.60 g/ft$^2$ using a solvent mixture of 75% by volume water to 25% by volume methanol. The barrier layer measures a thickness of 4.4 microns. The performance of the element at RH levels of 13%, 10%, and 7% respectively, is described hereinafter in connection with Tables XI, XII, and XIII.

EXAMPLE 33

A photoconductive element is prepared substantially as described in Comparative Example 8, except as described otherwise hereinafter. The barrier layer polymer is Polymer LL, a polyester ionomer having a planar tetracarbonylbisimide moiety content. The barrier layer is solution coated at a dry coverage of 0.6 g/ft$^2$ using a solvent mixture of 85% by volume water to 15% by volume methanol. The barrier layer has a thickness of 4.6 microns. Olin 10G surfactant is employed in the barrier layer coating solution at a concentration of 0.015 wt. % based on total solution weight. The charge generation layer (CGL) is coated on the barrier layer at a dry coverage of 0.075 g/ft$^2$.

EXAMPLE 34

A photoconductive element is prepared by coating the barrier layer Polymer LL in two separate passes. A first barrier layer of Polymer LL is initially applied to a substrate by using substantially the same procedures described in Example 33, except that the dry coverage is 0.2 g/ft$^2$. A second barrier layer of Polymer LL is then coated over the first barrier layer using substantially the same procedure described in Example 33, but is coated with a dry coverage of 0.6 g/ft$^2$. The combined barrier layers have a thickness of 5.4 microns.

EXAMPLE 35

A photoconductive element is prepared substantially as described in Example 34, except as described otherwise hereinafter. After coating the first barrier layer, a second barrier layer of Polymer EE is coated onto the first barrier layer of Polymer LL. The second barrier layer is solution coated from a solvent mixture of 85% by volume water to 15% by volume methanol. The combined barrier layers have a thickness of 6.0 microns.

EXAMPLE 36

A photoconductive element is prepared substantially as described in Example 34, except as described otherwise hereinafter. After coating the first barrier layer, a second barrier layer of Polymer II is coated onto the first barrier layer of Polymer LL. The second barrier layer is solution coated from a solvent mixture of 85% by volume water to 15% by volume acetone. The combined barrier layers have a thickness of 6.8 microns.

EXAMPLE 37

A photoconductive element is prepared substantially as described in Example 34, except as described otherwise hereinafter. After coating the first barrier layer, a second barrier layer of Polymer MM is coated onto the first barrier layer of Polymer LL. The second barrier layer is solution coated from a solvent mixture of 85% by volume water to 15% by volume ethanol. The combined barrier layers have a thickness of 6.4 microns.

EXAMPLE 38

A photoconductive element is prepared substantially as described in Example 34, except as described otherwise hereinafter. After coating the first barrier layer, a second barrier layer of Polymer NN is coated onto the first barrier layer of Polymer LL. The second barrier layer is solution coated from a solvent mixture of 75% by volume water to 25% by volume acetone. The combined barrier layers have a thickness of 6.0 microns.

EXAMPLE 39

A photoconductive element is prepared substantially as described in Comparative Example 8, except as described otherwise hereinafter. The barrier layer polymer is Polymer EE, a polyester ionomer having planar tetracarbonylbisimide moiety content. The barrier layer is solution coated at a dry coverage of 0.6 g/ft$^2$ using a solvent mixture of 95% by volume water to 5% by volume isopropanol. Olin 10G surfactant is employed in the barrier layer coating solution at a concentration of 0.015 wt. % based on total solution weight. The barrier layer has a thickness of 4.6 microns. The charge generation layer (CGL) is also coated on the foregoing barrier layer at a dry coverage of 0.075 g/ft$^2$.

EXAMPLE 40

A photoconductive element is prepared by coating the barrier layer Polymer EE in two separate passes. A first barrier layer of Polymer EE is initially applied to a substrate by using substantially the same procedures as described in Example 33, except that the dry coverage is 0.2 g/ft$^2$. A second barrier layer of Polymer EE is then coated over the first barrier layer using substantially the same procedures of Example 33, but is coated with a dry coverage of 0.6 g/ft$^2$. The combined barrier layers have a thickness of 6.0 microns.

EXAMPLE 41

A photoconductive element is prepared substantially as described in Example 40, except as described hereinafter. After coating the first barrier layer of Polymer EE, a second barrier layer of Polymer LL is coated onto the first barrier layer of Polymer EE. The second barrier layer is solution coated from a solvent mixture of 85% by volume water to 15% by volume methanol. The combined barrier layers have a thickness of 6.0 microns.

EXAMPLE 42

A photoconductive element is prepared substantially as described in Example 40, except as described hereinafter. After coating the first barrier layer of Polymer EE, a second barrier layer of Polymer II is coated onto the first barrier layer of Polymer EE. The second barrier layer is solution coated from a solvent mixture of 85% by volume water to 15% by volume acetone. The combined barrier layers have a thickness of 7.0 microns.

EXAMPLE 43

A photoconductive element is prepared substantially as described in Example 40, except as described hereinafter. After coating the first barrier layer of Polymer EE, a second barrier layer of Polymer MM is coated onto the first barrier layer of Polymer Example EE. The second barrier layer is solution coated from a solvent mixture of 85% by volume water to 15% by volume ethanol. The combined barrier layers have a thickness of 6.0 microns.

EXAMPLE 44

A photoconductive element is prepared substantially as described in Example 40, except as described hereinafter. After coating the first barrier layer of Polymer EE, a second barrier layer of Polymer NN is coated onto the first barrier layer of Polymer EE. The second barrier layer is solution coated from a solvent mixture of 75% by volume water to 25% by volume acetone. The combined barrier layers have a thickness of 6.8 microns.

EXAMPLE 45

A photoconductive element is prepared substantially as described in Comparative Example 8, except as described otherwise hereinafter. The barrier polymer is Polymer II, a polyester ionomer having planar tetracarbonylbisimide moiety content. The barrier layer is solution coated at a dry coverage of 0.6 g/ft$^2$ using a solvent mixture of 85% by volume water to 15% by volume acetone. Olin 10G surfactant is employed in the barrier layer coating solution at a concentration of 0.015 wt. % based on total solution weight. The barrier layer has a thickness of 4.6 microns. A charge generation layer (CGL) is also coated on the barrier layer at a dry coverage of 0.075 g/ft$^2$.

EXAMPLE 46

A photoconductive element is prepared substantially as described in Comparative Example 8, except as described otherwise hereinafter. The barrier polymer is Polymer MM, a polyester ionomer having planar tetracarbonylbisimide moiety content. The barrier layer is solution coated at a dry coverage of 0.6 g/ft$^2$ using a solvent mixture of 85% by volume water to 15% by volume ethanol. Olin 10G surfactant is employed in the barrier layer coating solution at a concentration of 0.015 wt. % based on total solution weight. The barrier layer has a thickness of 4.4 microns. A charge generation layer (CGL) is also coated on the barrier layer at a dry coverage of 0.075 g/ft$^2$.

EXAMPLE 47

A photoconductive element is prepared substantially as described in Comparative Example 8, except as described otherwise hereinafter. The barrier polymer is Polymer NN, a polyester ionomer having planar tetracarbonylbisimide moiety content. The barrier layer solution is solution coated at a dry coverage of 0.60 g/ft$^2$ using a solvent mixture of 75% by volume water to 25% by volume acetone. Olin 10G surfactant is employed in the barrier layer coating solution at a concentration of 0.015 wt. % based on total solution weight. The barrier layer has a thickness of 6.0 microns. A charge generation layer (CGL) is also coated on the barrier layer at a dry coverage of 0.075 g/ft$^2$.

EXAMPLE 48

A photoconductive element is prepared substantially as described in Comparative Example 8, except as described otherwise hereinafter. The barrier polymer is Polymer OO, a polyester ionomer having planar tetracarbonylbisimide moiety content. The barrier layer is solution coated at a dry coverage of 0.60 g/ft$^2$ using a solvent mixture of 80% by volume water to 20% by volume ethanol. Olin 10G surfactant is employed in the barrier layer coating solution at a concentration of 0.015 wt. % based on total solution weight. The barrier layer has a thickness of 6.0 microns. A charge generation layer (CGL) is also coated on the barrier layer at a dry coverage of 0.075 g/ft$^2$.

EXAMPLE 49

A photoconductive element is prepared substantially as described in Comparative Example 8, except as described otherwise hereinafter. The barrier polymer is Polymer PP, a polyester ionomer having planar tetracarbonylbisimide moiety content. The barrier layer is solution coated at a dry coverage of 0.60 g/ft$^2$ using a solvent mixture of 85% by volume water to 15% by volume isopropanol. Olin 10G surfactant is employed in the barrier layer coating solution at a concentration of 0.015 wt % based on total solution weight. The barrier layer has a thickness of 4.6 microns. A charge generation layer (CGL) is also coated on the barrier layer at a dry coverage of 0.075 g/ft$^2$.

EXAMPLE 50

A photoconductive element is prepared substantially as described in Comparative Example 8, except as described otherwise hereinafter. The barrier polymer is Polymer QQ, a polyester ionomer having planar tetracarbonylbisimide moiety content. The barrier layer is solution coated at a dry coverage of 0.80 g/ft$^2$ using a solvent mixture of 95% by volume water to 5% by volume acetone. Olin 10G surfactant is employed in the barrier layer coating solution at a concentration of 0.015 wt % based on total solution weight. The barrier layer has a thickness of 5.2 microns. A charge generation layer (CGL) is also coated on the barrier layer at a dry coverage of 0.075 g/ft$^2$.

EXAMPLE 51

A photoconductive element is prepared substantially as described in Comparative Example 8, except as otherwise described hereinafter. The barrier polymer is Polymer RR, a polyester ionomer having planar tetracarbonylbisimide moiety content. The barrier layer is solution coated at a dry coverage of 0.80 g/ft$^2$ using a solvent mixture of 95% by volume water to 5% by volume ethanol. Olin 10G surfactant is employed in the barrier layer coating solution at a concentration of 0.015 wt % based on total solution weight. The barrier layer has a thickness of 4.8 microns. A charge generation layer (CGL) is coated on the barrier layer at a dry coverage of 0.075 g/ft$^2$.

EXAMPLE 52

A photoconductive element is prepared substantially as described in Comparative Example 8, except as otherwise described hereinafter. The barrier polymer is Polymer SS, a polyester ionomer having planar tetracarbonylbisimide moiety content. The barrier layer is solution coated at a dry coverage of 0.60 g/ft$^2$ using a solvent mixture of 95% by volume water to 5% by volume ethanol. Olin 10G surfactant is employed in the barrier layer coating solution at a concentration of 0.015 wt % based on total solution weight. The barrier layer has a thickness of about 4 microns. A charge generation layer (CGL) is coated on the barrier layer at a dry coverage of 0.075 g/ft$^2$.

EXAMPLE 53

A photoconductive element is prepared substantially as described in Comparative Example 8, except as otherwise described hereinafter. The barrier polymer is Polymer TT, a polyester ionomer having planar tetracarbonylbisimide moiety content. The barrier layer is solution coated at a dry coverage of 0.80 g/ft$^2$ using a solvent mixture of 94% by volume water to 6% by volume ethanol. Olin 10G surfactant is employed in the barrier layer coating solution at a concentration of 0.015 wt % based on total solution weight. The barrier layer has a thickness of 6.0 microns. A charge generation layer (CGL) is coated on the barrier layer at a dry coverage of 0.075 g/ft$^2$.

EXAMPLE 54

A photoconductive element is prepared substantially as described in Comparative Example 8, except as otherwise described hereinafter. The barrier polymer is Polymer UU, a polyester ionomer having planar tetracarbonylbisimide moiety content. The barrier layer is solution coated at a dry coverage of 0.20 g/ft$^2$ using a solvent mixture of 95% by volume water to 5% by volume ethanol. Olin 10G surfactant is employed in the barrier layer coating solution at a concentration of 0.015 wt. % based on total solution weight. The barrier layer has a thickness of 2 microns. A charge generation layer (CGL) is coated on the barrier layer at a dry coverage of 0.075 g/ft$^2$.

EXAMPLE 55

A photoconductive element is prepared substantially as described in Comparative Example 8, except as described otherwise hereinafter. The barrier polymer was Polymer UU, a polyester ionomer having planar tetracarbonylbisimide moiety content. The barrier layer is solution coated at a dry coverage of 0.40 g/ft$^2$ using a solvent mixture of 95% by volume water to 5% by volume ethanol. Olin 10G surfactant is employed in the barrier layer coating solution at a concentration of 0.015 wt. % based on total solution weight. The barrier layer has a thickness of 3.2 microns. A charge generation layer (CGL) is coated on the barrier layer at a dry coverage of 0.075 g/ft$^2$.

EXAMPLE 56

A photoconductive element is prepared substantially as described in Comparative Example 8, except as otherwise described hereinafter. The barrier polymer is Polymer UU, a polyester ionomer having planar tetracarbonylbisimide moiety content. The barrier layer is solution coated at a dry coverage of 0.60 g/ft$^2$ using a solvent mixture of 95% by volume water to 5% by volume ethanol. Olin 10G surfactant is employed in the barrier layer coating solution at a concentration of 0.015 wt. % based on total solution weight. The barrier layer has a thickness of 4.4 microns. A charge generation layer (CGL) is coated on the barrier layer at a dry coverage of 0.075 g/ft$^2$.

Evaluation

The films are tested in a laboratory apparatus that charges, exposes, and erases the film continuously under controlled environments of temperature and relative humidity (RH). The residual or "toe" voltage after 1000 to 2000 cycles is recorded for each of the films and/or drums as previously described.

To evaluate breakdown and/or "black spot" formation susceptibility of drums, the drum being evaluated is used to replace the original drum of an Hewlett Packard HP5Si cartridge as previously described.

Film evaluation for breakdown involved the accumulative signal to noise ratios for specific film properties. The electrical breakdown measurement referred to in these experiments is calculated across a series of objective test results. Images are first created from the test films under noise conditions that stress the image breakdown by varying degrees. These images are scanned and estimates of the areas of increased density due to electrical breakdown are made. Single particles of toner, background, and most paper artifacts are eliminated from the measurement. Next the signal-to-noise for each film is calculated by applying a "smaller-the-better type" signal-to-noise equation to the data (described in "Quality Engineering Using Robust Design", by Madhav S. Phadke, Prentice Hall, 1989, page 131). The greater the signal-to-noise value, the better the photoconductor is for electrical breakdown. In this imaging system, a value greater than −8.5 is necessary to meet requirements.

Barrier layer thickness reported in Table X and elsewhere herein is obtained by measurement of optical micrograph cross-sections.

TABLE X

| | | | | Film Electrical Process Results | | | |
| --- | --- | --- | --- | --- | --- | --- | --- |
| | | | | | Vtoe @ 25° C./20% RH | | |
| Example No. | Barrier Polymer | Thickness (microns) | Black Spots | Initial | 1000K | 2000K | Delta |
| Comparative Example 8 | Comparative Polymer DD | 1.6 microns | | −27 | −302 | — | 275 |
| Comparative Example 9 | Comparative Polymer DD | 3.2 microns | | −28 | −382 | | 354 |

TABLE X-continued

Film Electrical Process Results

| Example No. | Barrier Polymer | Thickness (microns) | Black Spots | Vtoe @ 25° C./20% RH | | | |
|---|---|---|---|---|---|---|---|
| | | | | Initial | 1000K | 2000K | Delta |
| Comparative Example 10 | Comparative Polymer DD | 5.2 microns | | −20 | −456 | | 436 |
| Comparative Example 11 | Comparative Polymer DD | 7.2 microns | | −25 | −435 | | 410 |
| Comparative Example 13 | Comparative Poly. Mixture DD/AA (75/25) | 1.5 microns | | −54 | −99 | — | 45 |
| Comparative Example 14 | Comparative Poly. Mixture DD/AA (85/15) | 2.5 microns | | −117 | −165 | | 48 |
| Comparative Example 15 | Comparative Poly. Mixture DD/AA (95/5) | 2.0 microns | | −29 | −61 | | 32 |
| Comparative Example 16 | Comparative Polymer BB | 4.4 microns | | −190 | −368 | | 178 |
| Example 18 | Polymer CC | 4.4 microns | | −94 | −108 | | 14 |
| Example 20 | Polymer EE | 3.4 microns | 203 | −56 | −70 | — | 14 |
| Example 21 | Polymer FF | 3.2 microns | 192 | −57 | −89 | — | 32 |
| Example 22 | Polymer G | 4.0 microns | — | −11 | −14 | — | 3 |
| Example 23 | Polymer HH | 2.5 microns | | 27 | 38 | | 11 |
| Example 24 | Polymer LL | 2.0 microns | 1443 | −37 | −44 | — | 7 |
| Example 25 | Polymer LL | 3.2 microns | 890 | −12 | −22 | — | 10 |
| Example 26 | Polymer LL | 4.2 microns | 282 | −11 | −22 | — | 11 |
| Example 27 | Polymer II | 1.2 microns | — | −27 | −35 | — | 8 |
| Example 28 | Polymer JJ | 2.5 microns | — | −33 | −45 | — | 12 |

The photoreceptor cycling given in Table XI is a careful examination of the photoreceptor electrical properties. The humidity in the chamber where the tests are conducted is allowed to equilibrate for 6 hours after the photoreceptor is placed in the sensitometer device to evaluate regeneration sensitivity as previously described, to obtain more accurate comparisons of the barrier layer performance. The results show that during 1000 electrical cycles at 13% RH, the 0.75 micron Amilan® polymer barrier layer (Comparative Polymer DD) has higher residual voltage than thicker layers of the a polyester ionomer having a planer tetracarbonylbisimide moiety.

The photoreceptor cycling given in Table XII is a careful examination of the photoreceptor electrical properties. The humidity in the chamber is allowed to equilibrate for 24 hours after the experiment described above for a RH of 13% is completed. The results show that during 1000 electrical cycles at 10% RH, the 0.75 micron Amilan$^R$ barrier layer has higher residual voltage than thicker layers of the polyester ionomer having planar tetracarbonylbisimide moiety content, with the exception of 4.4 microns of Polymer EE in Example 32B, which has a residual voltage initially higher than Comparative Polymer DD, but ends the test lower (at −100 volts) compared to −125 volts for only 0.75 microns of the Amilan polymer, Comparative Polymer DD.

TABLE XI

13% RH Film Results

| Example | Barrier Polymer | Barrier Thickness | Residual Voltage (Vtoe) @ 25° C./13% RH For Various Cycles | | | | | | |
|---|---|---|---|---|---|---|---|---|---|
| | | | Initial | 200 | 400 | 600 | 800 | 1000 | Delta |
| Comparative Example 17A | Comparative Polymer DD | 0.75 micron | −30 | −70 | −75 | −80 | −95 | −90 | 60 |
| Example 29A | Polymer LL | 1.8 microns | −15 | −20 | −20 | −20 | −20 | −20 | 5 |
| Example 30A | Polymer LL | 3.4 microns | −20 | −20 | −20 | −20 | −20 | −20 | 0 |
| Example 31A | Polymer LL | 4.2 microns | −25 | −20 | −20 | −20 | −20 | −20 | 5 |
| Example 32A | Polymer EE | 4.4 microns | −50 | −50 | −50 | −50 | −50 | −50 | 0 |

TABLE XI

10% RH Film Results

| Example | Barrier Polymer | Barrier Thickness | Residual Voltage (Vtoe) @ 25° C./10% RH For Various Cycles | | | | | | |
|---|---|---|---|---|---|---|---|---|---|
| | | | Initial | 200 | 400 | 600 | 800 | 1000 | Delta |
| Comparative Example 17B | Comparative Polymer DD | 0.75 micron | −50 | −75 | −90 | −100 | −100 | −125 | 75 |
| Example 29B | Polymer LL | 1.8 microns | −35 | −20 | −20 | −20 | −20 | −20 | 15 |
| Example 30B | Polymer LL | 3.4 microns | −55 | −30 | −20 | −20 | −20 | −20 | 25 |
| Example 31B | Polymer LL | 4.2 microns | −85 | −35 | −25 | −25 | −25 | −25 | 60 |
| Example 32B | Polymer EE | 4.4 microns | −150 | −110 | −100 | −100 | −100 | −100 | 50 |

The photoreceptor cycling given in Table XIII below is a more careful examination of the photoreceptor electrical properties. The humidity in the chamber is allowed to equilibrate for an additional 72 hours after the experiment at a RH of 10% described above is completed. The results show that during 5000 electrical cycles at 7% RH, the 0.75 micron Amilan$^R$ barrier layer has higher residual voltage than thicker layers of the polyester ionomer having planar tetracarbonylbisimide moiety content, with the exception of 4.4 microns of Polymer EE in Example 13C which is slightly higher.

two separate passes which allowed two different barrier polymers to be used on the same photoreceptor. The environments consisted of three different RH levels of 20, 50, and 80%, respectively. Through most of the examples, the residual voltage (Vtoe in volts) decreases with increasing humidity level, and dark decay increases with increasing humidity level. Examples with lower residual voltages generally display higher dark decay. Both residual voltage and dark decay change as functions of the tetracarbonylbisimide, ethylene oxide, and sodium ion content. Example 19 shows the highest dark decay of any of the films, even though the residual voltage is not as low as many of the Examples.

TABLE XIII

7% RH Film Results

| Example | Barrier Polymer | Barrier Thickness | Residual Voltage (Vtoe) @ 23° C./7% RH For Various Cycles | | | | | | |
|---|---|---|---|---|---|---|---|---|---|
| | | | Initial | 1000 | 2000 | 3000 | 4000 | 5000 | Delta |
| Comparative Example 17C | Comparative Polymer DD | 0.75 micron | −75 | −180 | −180 | −170 | −170 | −160 | 105 |
| Example 29C | Polymer LL | 1.8 microns | −40 | −20 | −20 | −20 | −20 | −20 | 20 |
| Example 30C | Polymer LL | 3.4 microns | −80 | −30 | −25 | −25 | −20 | −20 | 50 |
| Example 31C | Polymer LL | 4.2 microns | −130 | −50 | −45 | −40 | −35 | −35 | 95 |
| Example 32C | Polymer EE | 4.4 microns | −180 | −150 | −140 | −130 | −120 | −120 | 60 |

Table XIV summarizes the voltages and dark decay at three different RH environments for Examples 19 and Examples 33–56, as well as the breakdown performance for the same photoreceptors. Some of the barriers are coated in Breakdown values for most of the films is good. In general, values below 500 give good image quality, and any value below 200 is considered superior.

TABLE XIV

Humidity, Dark Decay, and Breakdown Across Three Environments

| Example No. | 1st Barrier Layer Polymer | 2nd Barrier Layer Polymer | Total Barrier Thickness (microns) | 20% RH; 25 C; 1000 cycles | | | 50% RH; 25 C; 1000 cycles | | | 80% RH; 25 C.; 1000 cycles | | | Break-down; Blackspots |
|---|---|---|---|---|---|---|---|---|---|---|---|---|---|
| | | | | Vzero | Vtoe | Dark Decay | Vzero | Vtoe | Dark Decay | Vzero | Vtoe | Decay | |
| 19 | CC | — | 4.8 | −674 | −98 | 170 | −650 | −71 | 179 | −710 | −68 | 33 | 563 |
| 33 | LL | — | 4.6 | −705 | −35 | 59 | −691 | −26 | 69 | −637 | −26 | 137 | 124 |
| 34 | LL | LL | 5.4 | −707 | −48 | 59 | −682 | −23 | 63 | −670 | −27 | 152 | 174 |
| 35 | LL | EE | 6.0 | −713 | −62 | 69 | −702 | −31 | 67 | −677 | −39 | 151 | 62 |
| 36 | LL | II | 6.8 | −732 | −61 | 56 | −703 | −27 | 42 | −712 | −42 | 74 | 83 |
| 37 | LL | MM | 6.4 | −750 | −330 | 59 | −750 | −214 | 58 | −727 | −86 | 54 | 297 |
| 38 | LL | NN | 6.0 | −752 | −199 | 60 | −729 | −144 | 56 | −709 | −56 | 49 | 113 |
| 39 | EE | — | 4.6 | −702 | −37 | 69 | −703 | −33 | 138 | −652 | −48 | 169 | 195 |
| 40 | EE | EE | 6.0 | −707 | −30 | 63 | −715 | −30 | 77 | −674 | −40 | 153 | 83 |

TABLE XIV-continued

Humidity, Dark Decay, and Breakdown Across Three Environments

| Example No. | 1st Barrier Layer Polymer | 2nd Barrier Layer Polymer | Total Barrier Thickness (microns) | 20% RH; 25 C; 1000 cycles | | | 50% RH; 25 C; 1000 cycles | | | 80% RH; 25 C.; 1000 cycles | | | Break-down; Blackspots |
|---|---|---|---|---|---|---|---|---|---|---|---|---|---|
| | | | | Vzero | Vtoe | Dark Decay | Vzero | Vtoe | Dark Decay | Vzero | Vtoe | Decay | |
| 41 | EE | LL | 6.0 | −711 | −49 | 61 | −687 | −26 | 90 | −712 | −42 | 74 | 62 |
| 42 | EE | II | 7.0 | −727 | −87 | 66 | −703 | −37 | 46 | −682 | −47 | 130 | 104 |
| 43 | EE | MM | 6.0 | −742 | −239 | 59 | −736 | −153 | 57 | −723 | −71 | 56 | 91 |
| 44 | EE | NN | 6.8 | −740 | −161 | 65 | −731 | −104 | 66 | −728 | −85 | 48 | 75 |
| 45 | II | — | 4.6 | −727 | −61 | 66 | −720 | −35 | 53 | −712 | −39 | 78 | 106 |
| 46 | MM | — | 4.4 | −748 | −242 | 47 | −742 | −150 | 49 | −736 | −101 | 48 | 99 |
| 47 | NN | — | 6.0 | −752 | −199 | 60 | −729 | −144 | 56 | −709 | −56 | 49 | 113 |
| 48 | OO | — | 6.0 | −717 | −111 | 50 | −719 | −80 | 53 | −717 | −65 | 52 | 289 |
| 49 | PP | — | 4.6 | −717 | −37 | 42 | −721 | −41 | 70 | −712 | −55 | 81 | 811 |
| 50 | QQ | — | 5.2 | −733 | −155 | 60 | −726 | −85 | 59 | −711 | −72 | 54 | — |
| 51 | RR | — | 4.8 | −734 | −183 | 57 | −734 | −131 | 62 | −712 | −113 | 68 | — |
| 53 | TT | — | 6.0 | −739 | −215 | 49 | −710 | −56 | 63 | — | — | — | — |
| 54 | UU | — | 2.0 | −717 | −41 | 32 | −714 | −36 | 41 | −720 | −81 | 28 | 1836 |
| 55 | UU | — | 3.2 | −713 | −47 | 46 | −702 | −37 | 40 | −732 | −107 | 31 | 549 |
| 56 | UU | — | 4.4 | −721 | −52 | 41 | −716 | −43 | 42 | −736 | −115 | 31 | 287 |

Examples 54–56 represent a preferred set of barrier layers. As the barrier thickness increases the breakdown drops to low levels, the residual voltages remain low across all of the environments, and the dark decay does not vary more than 10 volts. These readings are taken after 1000 prints are made, and the image quality of the prints is very good. However some applications require the photoreceptor to remain flexible over time, and images made using this photoreceptor can show blemishes with increasing number of prints. These blemishes are believed to be due to possible cracking of the barrier layer as the photoreceptor is cycled in the printer. Thus, it may be desirable to increase the toughness of the barrier layer when the photoreceptor is a flexible web, instead of a rigid drum.

Example 33 is an example of a barrier layer that shows no image degradation even after printing 100,000 images. This barrier layer employs sebacic acid in the polymer backbone. This eight carbon methylene chain moiety makes the barrier layer more flexible. In addition, polymers made with the sebacic acid are higher molecular weight, which improves the film forming properties and makes the films tougher or less brittle. Example 33 shows that good residual voltages and relatively low breakdown results can be achieved with using this barrier layer polymer.

Good barrier properties are also obtained by addition of longer ethylene oxide repeat blocks to the polymers. Comparison of Example 50 with Example 53 shows that replacing 5 mole % of the diethylene glycol with tetraethylene glycol results in lower residual voltages at the low humidity regions, without suffering an increase in dark decay across all of the environments. Additionally, introduction of longer, more flexible ether blocks due to the tetraethylene glycol produces a higher molecular weight polymer. As discussed above, these polymers should have less of a tendency to crack on flexible supports. A more extreme example of the effects of the longer ethylene oxide chain is seen in Example 49 where 40 mole % of the tetraethylene glycol is in Polymer PP. The residual voltages are low and cracking is not observed.

Improved mechanical properties are also observed when a mixture of cis- and trans-isomers of cyclohexane are incorporated into the barrier polymer, instead of the all trans-cyclohexanedicarboxylate. This is shown by the lower glass transition temperature of Polymer RR (Tg 99° C.) than Polymer TT (Tg 115° C.).

The invention has been described in detail with particular reference to certain preferred embodiments thereof, but it will be understood that variations and modifications can be effected within the spirit and scope of the invention.

We claim:

1. A photoconductive element that transports positive charge carriers, generated by a charge generation layer, to dissipate surface negative charges, said photoconductive element comprising an electrically conductive support, an electrical barrier layer and, disposed over said barrier layer, said charge generation layer capable of generating said positive charge carriers when exposed to actinic radiation, said barrier layer comprising a condensation polymer which can transport charge by electronic transport mechanisms, said polymer being a polyester-co-imide, polyesterionomer-co-imide, or polyamide-co-imide and including as a repeating unit a planar, electron-deficient aromatic tetracarbonyl-bisimide group.

2. The photoconductive element of claim 1 wherein said barrier layer polymer comprises, as repeating units, tetracarbonylbisimide groups of the structure:

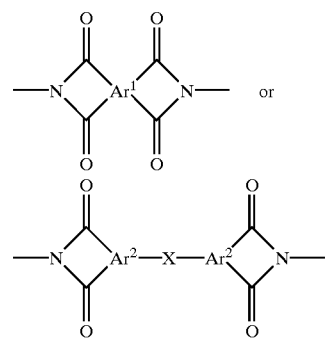

wherein:
Ar$^1$ is a tetravalent aromatic group of from about 6 to about 20 carbon atoms;
Ar$^2$ independently represent trivalent aromatic groups of from about 6 to about 20 carbon atoms; and
X is O, C(CF$_3$)$_2$, S=O or SO$_2$.

3. A photoconductive element comprising an electrically conductive support, an electrical barrier layer and, coated over said barrier layer, a charge generation layer capable of generating positive charge carriers when exposed to actinic radiation, said barrier layer comprising a polyesterionomerco-imide condensation polymer which can transport charge by electronic and ionic transport mechanisms, said polymer including as a repeating unit, a planar, electron-deficient aromatic tetracarbonylbisimide group.

4. The photoconductive element of claim 3 wherein said tetracarbonylbisimide group has the structure:

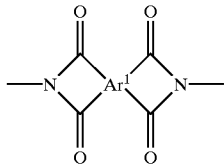

wherein:
Ar¹ represents a tetravalent aromatic group of from about 6 to about 20 carbon atoms.

5. The photoconductive element of claim 3 wherein the barrier layer has a thickness of greater than about 2 microns.

6. The photoconductive element of claim 3 wherein the electrically conductive support comprises a flexible material having a layer of metal disposed thereon.

7. The photoconductive element of claim 6 wherein the metal is nickel.

8. The photoconductive element of claim 3 wherein the condensation polymer further comprises alkyleneoxy repeat groups having from about 2 to about 36 carbon atoms.

9. The photoconductive element of claim 8 wherein the alkyleneoxy repeat groups are derived by condensation of a polyethylene glycol having a molecular weight of less than about 600.

10. The photoconductive element of claim 8 wherein the alkyleneoxy repeat groups are derived by condensation of a polyethylene glycol having a molecular weight of less than about 300.

11. The photoconductive element of claim 8 wherein the alkyleneoxy repeat units are present in an amount of up to about 95 mol % based on total diol content.

12. The photoconductive element of claim 3 wherein the condensation polymer further comprises a divalent cyclohexyl moiety.

13. The photoconductive element of claim 12 wherein the divalent cyclohexyl moiety is derived by condensation of at least one of trans-1,4-dimethylcyclohexanedicarboxylate, cis-1,4-dimethylcyclohexanedicarboxylate, and acids thereof.

14. The photoconductive element of claim 13 wherein the divalent cyclohexyl moiety is present in an amount of up to about 80 mol % based on total diacid content.

15. The photoconductive element of claim 3 wherein the condensation polymer further comprises a divalent phenyl moiety substituted with an ionic group selected from sulfonates, phosphonates, sulfonamides, or bissulfonamides.

16. The photoconductive element of claim 15 wherein the ionic group is sulfonate.

17. The photoconductive element of claim 15 wherein the ionic group has an associated counterion selected from alkali metals, ammonium, or phosphonium ions.

18. The photoconductive element of claim 15 wherein the ionic group has an associated counterion selected from ions of lithium, sodium, potassium, cesium, trimethylammonium, triethylammonium, diethylhydroxyethylammonium, dihydroxyethylethylammonium, triphenylmethylphosphonium, and mixtures thereof.

19. The photoconductive element of claim 16 wherein the ionic group has a sodium cation.

20. The photoconductive element of claim 15 wherein the divalent phenyl moiety substituted with an ionic group is derived by condensation of at least one of dimethyl-5-sodiosulfoisophthalate, dimethyl-3,3'-iminobis-sodiosulfonyl-benzoate, dimethyl-5-(N-potassio-p-toluenesulfonylamido)sulfonyl-isophthalate, or dimethyl-5-(4-sodiosulfonxy)-isophthlate.

21. The photoconductive element of claim 15 wherein the divalent phenyl moiety substituted with an ionic group is present in an amount of from about 20 mol % to 80 mol % based on total diacid content.

22. The photoconductive element of claim 3 wherein the aromatic tetracarbonylbisimide group is selected from 1,2,4,5-benzenetetracarboxylic bisimides; 1,4,5,8-naphthalenetetracarboxylic bisimides; 3,4,9,10-perylanetetracarboxylic bisimides; 2,3,6,7-anthraquinonetetracarboxylic bisimides, hexafluoroisopropylidene-2,2',3,3'-bisimides, and mixtures thereof.

23. The photoconductive element of claim 22 wherein the aromatic tetracarbonylbisimide group is present in an amount of from about 5 mol % to 100 mol % based on total diol content.

24. The photoconductive element of claim 22 wherein the aromatic tetracarbonylbisimide group is present in an amount of from about 10 mol % to about 80 mol % based on total diol content.

25. A photoconductive element comprising an electrically conductive support, an electrical barrier layer and, disposed over said barrier layer, a charge generation layer capable of generating positive charge carriers when exposed to actinic radiation, said barrier layer comprising a polyesterionomer-co-imide condensation polymer including tetracarbonylbisimide groups which polymer can transport charge by electronic and ionic transport mechanisms, said condensation polymer being represented by the formula:

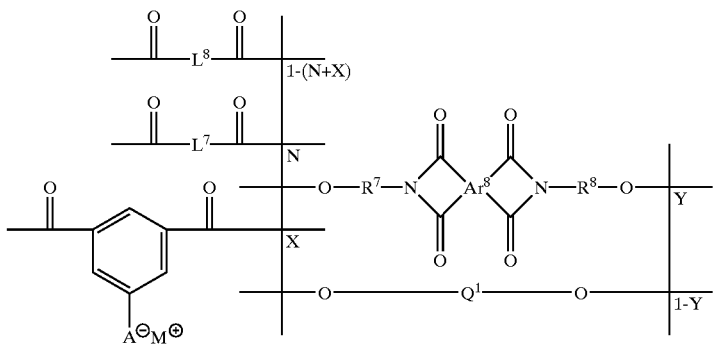

wherein:
- $Ar^8$ is a tetravalent aromatic group having from about 6 to about 20 carbon atoms;
- $Q^1$ represents an alkyleneoxy group having from about 2 to about 36 carbon atoms;
- $R^7$ and $R^8$ independently represent alkylene or alkyleneoxy groups having from about 2 to about 12 carbon atoms;
- $L^7$ represents an aromatic moiety having from about 6 to about 20 carbon atoms;
- $L^8$ represents a saturated or unsaturated, linear, branched, and or cyclic aliphatic group having from about 2 to about 24 carbon atoms;
- A– represents an ionic moiety selected from sulfonates, phosphonates, sulfonamides, or bissulfonamides;
- $M^+$ represents a counterion selected from alkali metal, ammonium, or phosphonium cations;
- Y is a mole fraction having a value of from about 0.05 to 1.0;
- X is a mole fraction having a value of from about 0.2 to about 0.8; and
- N is a mole fraction having a value of from 0 to about 0.8.

26. The photoconductive element of claim 25 wherein the $M^+$ cation is selected from ions of lithium, sodium, potassium, cesium, trimethylammonium, triethylammonium, diethylhydroxyethylammonium, dihydroxyethylethylammonium, triphenylmethylphosphonium, and mixtures thereof.

27. The photoconductive element of claim 25 wherein A is a $SO_3^-$ sulfonate group.

28. The photoconductive element of claim 27 wherein the $M^+$ cation is selected from ions of lithium, sodium, potassium, cesium, trimethylammonium, triethylammonium, diethylhydroxyethylammonium, dihydroxyethylethylammonium, triphenylmethylphosphonium, and mixtures thereof.

29. The photoconductive element of claim 27 wherein $M^+$ is a sodium ion.

30. The photoconductive element of claim 25 wherein Y is from about 0.25 to about 0.75.

31. The photoconductive element of claim 25 wherein X is from about 0.35 to about 0.5.

32. The photoconductive element of claim 25 wherein N is from about 0.2 to about 0.5.

33. The photoconductive element of claim 25 wherein the condensation polymer is substantially insoluble in a solvent employed for coating the charge generation layer onto the barrier layer.

34. The photoconductive element of claim 25 wherein the condensation polymer is soluble in polar solvents.

35. The photoconductive element of claim 25 wherein the condensation polymer is soluble in a polar solvent selected from water, methanol, ethanol, propanol, iso-propanol, or mixtures thereof.

36. The photoconductive element of claim 35 wherein the polar solvent further includes a ketone selected from acetone, methylethylketone, methylisobutylketone, or mixtures thereof.

37. The photoconductive element of claim 25 wherein said tetracarbonylbisimide groups are selected from 1,2,4,5-benzenetetracarboxylic bisimides; 1,4,5,8-naphthalenetetracarboxylic bisimides; 3,4,9,10-perylanetetracarboxylic bisimides; 2,3,6,7-anthraquinonetetracarboxylic bisimides and hexafluoroisopropylidene-2,2',3,3'-bisimides.

38. The photoconductive element of claim 25 wherein $L^8$ is a divalent cyclohexyl moiety.

39. The photoconductive element of claim 38 wherein the divalent cyclohexyl moiety is derived by condensation of at least one of trans-1,4-dimethylcyclohexanedicarboxylate, cis-1,4-dimethylcyclohexanedicarboxylate, and acids and anhydrides thereof.

40. The photoconductive element of claim 25 wherein $L^8$ is derived by condensation of at least one of dimethyl succinate, dimethyl glutarate, dimethyl azelate, dimethyl adipate, dimethyl sebacate, and acids and anhydrides thereof.

41. The photoconductive element of claim 25 wherein $L^8$ is derived by condensation of at least one of maleic acid, dodecanediodic acid, 1-methylsuccinic acid, and esters and anhydrides thereof.

42. The photoconductive element of claim 25 wherein $L^7$ is derived by condensation of at least one of terephthalic acid, dimethylisophthalic acid, isophthalic acid, pyromellitic acid, 2,6-naphthanoic acid, 5-t-butylisophthalic acid, 1,1,3-trimethyl-3-(4-carboxyphenyl)-5-indancarboxylic acid, and esters and anhydrides thereof.

43. The photoconductive element of claim 25 wherein the barrier layer has a thickness of greater than about 2 microns.

44. The photoconductive element of claim 25 wherein the barrier layer has a thickness of greater than about 3 microns.

45. The photoconductive element of claim 25 wherein the barrier layer has a thickness of greater than about 4 microns.

46. The photoconductive element of claim 25 wherein the alkyleneoxy groups are derived by condensation of a polyethylene glycol having a molecular weight of less than about 600.

47. The photoconductive element of claim 25 wherein the alkyleneoxy groups are derived by condensation of a polyethylene glycol having a molecular weight of less than about 300.

48. The photoconductive element of claim 25 wherein the electrically conductive support comprises a flexible material having a layer of metal thereon.

49. The photoconductive element of claim 48 wherein the metal is nickel.

50. The photoconductive element of claim 25 wherein said condensation polymer is poly[2,2'-oxydiethylene-co-1,4,5,8-naphthalenetetracarbonyl-bisimido-5-pentamethylene (62.5/37.5) isophthalate-co-5-sodiosulfoisophthaltate (50/50)].

51. The photoconductive element of claim 25 wherein the condensation polymer is poly[2,2'-oxydiethylene-co-1,4,5,8-naphthalenetetracarbonyl-bisimido-5-pentamethylene (50150) isophthalate-co-5-sodiosulfoisophthaltate (50/50)].

52. The photoconductive element of claim 25 wherein the condensation polymer is poly[2,2'-oxydiethylene-co-1,4,5,8-naphthalenetetracarbonyl-bisimido-5-pentamethylene (25/75) isophthalate-co-5-sodiosulfoisophthaltate (50/50)].

53. The photoconductive element of claim 25 wherein the condensation polymer is poly[2,2'-oxydiethylene-co-1,4,5,8-naphthalenetetracarbonyl-bisimido-5-pentamethylene (75/25) trans-cyclohexanedicarboxylate-co-5-sodiosulfoisophthaltate (50/50)].

54. The photoconductive element of claim 25 wherein the condensation polymer is poly[2,2'-oxydiethylene-co-1,4,5,8-naphthalenetetracarbonyl-bisimido-5-pentamethylene (25/75) trans-cyclohexanedicarboxylate-co-5-sodiosulfoisophthaltate (50/50)].

55. The photoconductive element of claim 25 wherein the condensation polymer is poly[2,2'-oxydiethylene-co-1,4,5,8-naphthalenetetracarbonyl-bisimido-5-pentamethylene (75/25) sebacate-co-5-sodiosulfoisophthaltate (50/50)].

56. The photoconductive element of claim 25 wherein the condensation polymer is poly[2,2'-oxydiethylene-co-1,4,5,8-naphthalenetetracarbonyl-bisimido-5-pentamethylene (75/25) isophthalate-co-sebacate-co-5-sodiosulfoisophthaltate (30/25/45)].

57. The photoconductive element of claim 25 wherein the condensation polymer is poly[2,2'-oxydiethylene-co-1,4,5, 8-naphthalenetetracarbonyl-bisimido-5-pentamethylene (75/25) isophthalate-co-5-sodiosulfoisophthaltate (70/30)].

58. The photoconductive element of claim 25 wherein the condensation polymer is poly[2,2'-oxydiethylene-co-1,4,5,8-naphthalenetetracarbonyl-bisimido-5-pentamethylene (50/50) isophthalate-co-5-sodiosulfoisophthaltate (70/30)].

59. The photoconductive element of claim 25 wherein the condensation polymer is poly[2,2'-oxydiethylene-co-1,4,5,8-naphthalenetetracarbonyl-bisimido-5-pentamethylene (25/25) isophthalate-co-sebacate-co-5-sodiosulfoisophthaltate (15/40/45)].

60. The photoconductive element of claim 25 wherein the condensation polymer is poly[2,2'-oxydiethylene-co-5,5'-oxybis(diethyleneoxy)-co-1,4,5,8-naphthalenetetracarbonyl-bisimido-5-pentamethylene (35/40/25) isophthalate-co-5-sodiosulfliso-phthaltate (50/50)].

61. The photoconductive element of claim 25 wherein the condensation polymer is poly[2,2'-oxydiethylene-co-5,5'-oxybis(diethyleneoxy)-co-1,4,5,8-naphthalenetetracarbonyl-bisimido-5-pentamethylene (45/5/50) trans-cyclohexanedicarboxylate-co-5-sodiosulfoiso-phthaltate (60/40)].

62. The photoconductive element of claim 25 wherein the condensation polymer is poly[2,2'-oxydiethylene-co-1,4,5,8-naphthalenetetracarbonyl-bisimido-5-pentamethylene (50/50) cyclohexanedicarboxylate-co-5-sodiosulfoisophthaltate (60/40)].

63. The photoconductive element of claim 25 wherein the condensation polymer is poly[2,2'-oxydiethylene-co-5,5'-oxybis(diethyleneoxy)-co-1,4,5,8-naphthalenetetracarbonyl-bisimido-5-pentamethylene(48/2/50) cyclohexanedicarboxylate-co-5-sodiosulfoisophthaltate (60/40)].

64. The photoconductive element of claim 25 wherein the condensation polymer is poly[2,2'-oxydiethylene-co-1,4,5,8-naphthalenetetracarbonyl-bisimido-5-pentamethylene (50/50) trans-cyclohexanedicarboxylate-co-5-sodiosulfoisophthaltate (60/40)].

65. The photoconductive element of claim 25 wherein the condensation polymer is poly[2,2'-oxydiethylene-co-1,4,5,8-naphthalenetetracarbonyl-bisimido-5-pentamethylene (50/50) trans-cyclohexanedicarboxylate-co-5-sodiosulfoisophthaltate (50/50)].

\* \* \* \* \*